US006538996B1

(12) United States Patent
West et al.

(10) Patent No.: US 6,538,996 B1
(45) Date of Patent: Mar. 25, 2003

(54) REMOTE COMPUTER COMMUNICATION

(75) Inventors: Julian Wray West, Salem, NH (US); Bradford H. Kemp, Salem, NH (US); Carol M. Howard, Fitchburg, MA (US); Paul R. Jones, Jr., Westboro, MA (US); Jeffrey M. Mullen, Sudbury, MA (US); Ronald L. Currier, Jr., Bradford, MA (US)

(73) Assignee: Enterasys Networks, Inc., Andover, MA (US)

( * ) Notice: Subject to any disclaimer, the term of this patent is extended or adjusted under 35 U.S.C. 154(b) by 0 days.

(21) Appl. No.: 09/557,568

(22) Filed: Apr. 25, 2000

Related U.S. Application Data

(63) Continuation of application No. 09/030,647, filed on Feb. 25, 1998, now Pat. No. 6,081,508.

(51) Int. Cl.⁷ .................................................. H04Q 7/00
(52) U.S. Cl. ......................... 370/238; 370/352; 714/25
(58) Field of Search ................................ 370/351, 254, 370/229, 464, 352, 465, 255, 238, 356, 237, 358, 353, 354; 709/220, 221, 222; 714/31, 32, 46, 25

(56) References Cited

U.S. PATENT DOCUMENTS

| 5,367,667 | A |   | 11/1994 | Wahlquist |        |
|-----------|---|---|---------|-----------|--------|
| 5,812,819 | A |   | 9/1998  | Rodwin    |        |
| 5,881,236 | A |   | 3/1999  | Dickey    |        |
| 5,892,451 | A |   | 4/1999  | May       |        |
| 5,905,779 | A |   | 5/1999  | Steinmetz |        |
| 5,983,364 | A | * | 11/1999 | Botcosh   | 714/25 |
| 6,192,045 | B1| * | 2/2001  | Williams  | 370/352|
| 6,205,126 | B1| * | 3/2001  | Moon      | 370/329|

* cited by examiner

Primary Examiner—Douglas Olms
Assistant Examiner—Ricardo M. Pizarro
(74) Attorney, Agent, or Firm—Fish & Richardson P.C.

(57) ABSTRACT

A user of a remote typically has a choice of multiple access methods and telephone numbers using which the user can connect his remote computer to a local computer or a local area network. The remote user often user faces several problems. These problems include first knowing what numbers and access methods the user has a choice of, and knowing the cost of using those numbers and access methods. This first problem is exasperated by a large number of available access points, changes of access telephone numbers, changes in telephone and network access rates, and changes in quality of service provided by various service providers. Distributing, storing, and searching a comprehensive directory of access numbers and associated costs would, in general, be prohibitive on remote computers with limited storage and computation capacity, such as portable computers typically often used by mobile workers. Furthermore, if the user is not successful in establishing a desired communication path, several courses of action may be available to the user. The user's second problem involves choosing an appropriate course of action which, in general, requires a diagnosis of the problem encountered in making the desired connection.

34 Claims, 24 Drawing Sheets

(a)

(b)

(c)

(a)

(b)

REMOTE COMPUTER COMMUNICATION

Under 35 USC §120, this application is a continuation application of U.S. Ser. No. 09/030,647, filed Feb. 25, 1998 now U.S. Pat. No. 6,081,508.

BACKGROUND

The invention relates to communication between a remote computer and a computer or a computer network.

Users of remote computers, such as mobile lap-top computers, can often access computers permanently connected to a local corporate network (local computers) using a variety of communication paths. For instance, a user of a remote computer can use a dialed telephone connection to establish a modem-based data link between the remote computer and a remote communication server on the corporate network. Alternatively, the user can use a dialed telephone connection to an access point of a public wide area network, such as the Internet, and then communicate with the corporate network through the wide area network. A user may often have a choice of several different telephone access numbers which he can use to establish a communication path between the remote computer and the corporate network.

SUMMARY

When a remote user has a choice of multiple telephone numbers through which he may connect his remote computer to a local computer or a local area network, the remote user faces several problems. These problems include first knowing what numbers and access methods (e.g., connection speeds and communication protocols) he has a choice of, and knowing the cost of using those numbers and access methods. This first problem is exasperated by the large number of access points available, changes of access telephone numbers, changes in telephone and network access rates, and changes in quality of service provided by various service providers. Distributing, storing, and searching a comprehensive directory of access numbers and associated costs would, in general, be prohibitive on remote computers with limited storage and computation capacity, such as portable computers typically used by mobile workers.

Having chosen a desired access telephone number, the user may not be successful in establishing a data communication channel using that telephone number. Establishing a communication channel requires proper operation and interaction of a large number of software and hardware elements. A hardware or software failure, misconfiguration, or incompatibility, in one or more elements in the communication path can prevent a connection from being successfully established. Failures can also occur at any of a number of steps which must be carried out to establish a communication channel. These include failure to properly connect to a telephone line, improper dialing due to an incorrect telephone number or incorrect dialing prefix, unsuccessful connection to an ISP due to hardware or software problems at the POP, unsuccessful or poor data transfer over the Internet, unsuccessful connection to a tunnel server, unsuccessful communication between the remote computer and software executing on the tunnel server, and unsuccessful communication between a tunnel server and other computers on the LAN.

If a user is not successful in establishing a desired communication path, several courses of action may be available to the user. For example, he may attempt to connect using the same telephone number again, or connect using another telephone number. In addition, he may correct a software or hardware problem on the remote computer before reconnecting.

Choosing the appropriate course of action, in general, requires a diagnosis of the problem encountered in making the desired connection. Different users of remote computers may have different levels of expertise and ability to diagnose the problem.

Another aspect of remote communication that often introduces complexity, and may be a source of errors, relates to security. In order to control access to wide area and local area networks, and access to particular computers or systems accessible over those networks, a user must typically interact with multiple authentication and authorization systems. It is not uncommon for a remote user to have to supply one password when connecting to a wide area network, another to establish a connection to a corporate network, and yet another when finally accessing a computer system, such as a mail server.

Aspects of the invention, in general, provide a comprehensive system which identifies, models, and automates aspects of establishing remote access to a local computer network. The system involves several inter-related components. The system provides support for determining appropriate telephone access numbers for use by a remote user, and provides support to that user if a connection cannot be successfully established. Difficulties associated with distribution and searching of telephone access number data are overcome, in part, by organizing data that is stored on a remote computer to be both compact and easily searched, and by incrementally downloading that data as a background communication task. A software infrastructure supports authentication and authorization functions, and permits diagnosis and correction of most problems that a remote user may encounter in attempting to establish communication with a local computer. Using this system, lowest cost telephone access numbers are automatically determined for a user based on his location without requiring the user to assess the relative costs of using different telephone numbers. Also, little or no computer-related expertise is required of the remote user to establish a connection, even in the face of correctable hardware or software failures.

In one aspect, in general, the invention provides software, stored on a computer readable medium, for causing a remote computer to establish a data communication path to a computing resource, such as a data network. The method includes determining a set of access paths for communicating between the remote computer and the computing resource, and evaluating a cost function which characterizes the cost of communicating between the remote computer and the computing resource over that access path. The cost function can includes both monetary and performance related factors. The method also includes selecting a best one of the access paths according to the evaluated cost functions for the access paths, for example selecting the lowest cost path, and then initiating establishment of communication over the selected best access path. The access path can feature a dialed telephone channel to a telephone access number associated with that access path, and establishment of communication over the access path can include dialing the telephone access number.

The method can also feature accepting an identification of a location of the remote computer determining a set of access paths according to the telephone charges associated with use of dialed telephone channels to each of the telephone access numbers from the location of the remote computer.

The method can also feature accepting an identification of a user of the remote computer and the cost function can includes weighting terms chosen according to the identification of the user.

The method can also feature the remote computer accepting a dialing database which includes telephone access numbers, and accepting an identification of the computing resource with which a communication channel is to be established. The remote computer then accesses the dialing database to determine the set of access paths for communicating with the computing resource.

The method can also feature selecting a next best access path according to the evaluated cost functions for the access paths, if communication over the selected best access path is not established. If communication over an access path cannot be successfully established, the method can also feature performing diagnostics related to the unsuccessful establishment of the communication path, for example, by interpreting a diagnostic script, accepted from another computer, which implements a procedure to determine a cause for the unsuccessful connection. A diagnostic procedure can include contacting a reference site not on the remote computer and verifying that the remote computer can communicate with the reference site. Contacting a reference site can include establishing a dialed telephone connection to a reference telephone number or contacting a network device a data network coupling the remote computer and the network device. The diagnostic procedure can also include determining whether a software module on the remote computer requires installation, and if so, installing that software module.

The method can also feature accepting credentials which identify a user of the remote computer. The user is authenticated by the remote computer using an authentication service on another computer. The method can also feature establishing a management communication path to the other computer and accepting information including information for a dialing database over the management communication path.

In anther aspect of the invention, in general, the invention provides software for causing a computer, such as a management server, to store a dialing database, including telephone access numbers for access paths, and establish an authenticated management communication path between the computer and a remote computer. The computer then provides information from the dialing database to a remote computer, for use on the remote computer in selecting an access path between the remote computer and a computing resource.

The execution of the software can also feature accepting master dialing information and accepting local information, including information related to computing resources accessible from the remote computer, and maintaining the dialing database using the master dialing information and the local information. The master dialing information can include telephone access numbers for access paths, and information related to a cost of communicating over dialed telephone connections to those access numbers from remote locations.

The execution of the software can also feature accepting performance related logging information from remote computers and updating the performance related cost factors based on the logging information.

Other features and advantages of the invention will be apparent from the following description, and from the claims.

DESCRIPTION

Figure 1:
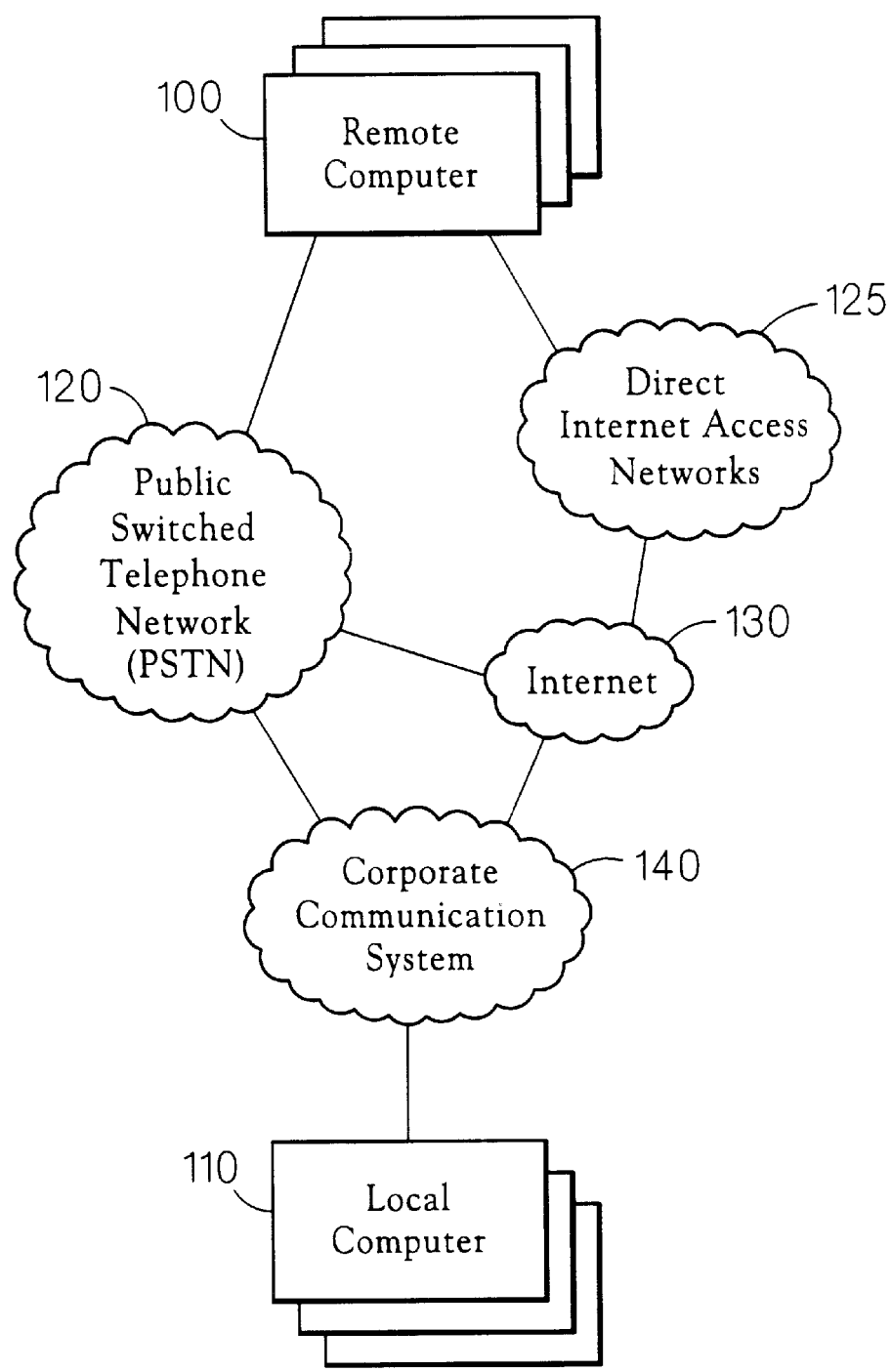
FIG. 1 shows remote computers coupled to local computers through telephone and data networks.

Referring to FIG. 1, an illustrative embodiment of the invention features one of a number of remote computers 100 communicating with one or more local computers 110 that are coupled directly to a corporate communication system 140. Corporate communication system 140 is made up, for example, of a local area network (LAN) and communication related computers and routing devices coupled to the network. Remote computer 100 can establish a variety of communication paths to a local computer 110, three examples of which are shown in FIG. 1. For example, remote computer 100 can use public switched telephone network (PSTN) 120 to establish a dialed telephone connection coupling remote computer 100 directly to corporate communication system 140. Alternatively, remote computer 100 can establish a dialed telephone connection to couple the remote computer to Internet 130. In this case, a communication path through Internet 130 then completes a connection path from remote computer 100 to corporate communication system 140, to which local computer 110 is coupled. Remote computer 100 can also be coupled to a direct Internet access network 125. Direct Internet access network 125 can use a variety of communication approaches, such as a cable television (CATV) network, a digital subscriber loop (xDSL) data connection over local telephone wiring, or a cellular digital packet data (CDPD) wireless connection. A communication path from remote computer 100 through direct Internet access network 125, Internet 130, and corporate communication system 140 then couples remote computer 100 and local computer 110.

As described above, alternative types of communication paths that can be established between remote computer 100 and local computer 110, such as directly, or through the Internet. In addition, alternative paths of each type can be used, for example, using different telephone access numbers or different tunnel servers. Internet 130 and corporate communication system 140 can each have multiple access points to which a telephone connection can be established by dialing particular telephone numbers. For instance, many different companies, called Internet Service Providers (ISPs), each maintain multiple locations that provide telephone access to the Internet 130. These access points are called Points of Presence (POPs). Each POP has a bank of modems that can be accessed by dialing one or more telephone numbers. Alternative points of connection between Internet 130 and corporate communication system 140 can also be available. These connection points can be geographically separated, or can involve use of different communication hardware in corporate communication system 140. A corporation can also provide multiple telephone access points to a corporate network, particularly if it maintains a private geographically distributed network.

Aspects of the invention address establishing a communication path between remote computer 100 and local computers 110. Establishing a path involves selecting an appropriate type of communication path, and a specific path of the selected type. Selection is based on attempting to provide the lowest total cost of connection, where total cost reflects both monetary and performance factors weighted appropriately for a particular user of remote computer 100. Aspects of the invention also address detecting, diagnosing, and correcting difficulties that may be encountered while trying to establish a connection.

From the point of view of a user of remote computer 100, establishing a connection to corporate communication system 140 appears straightforward. After a connection is established, remote computer 100 communicates with local computers 110 as if the remote computer were also coupled directly to corporate communication system 140.

Figure 2:
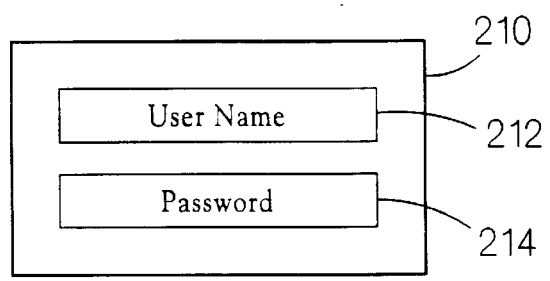
FIGS. 2(a–c) illustrates three dialog boxes used to interact with a user of a remote computer.
Figure 2:
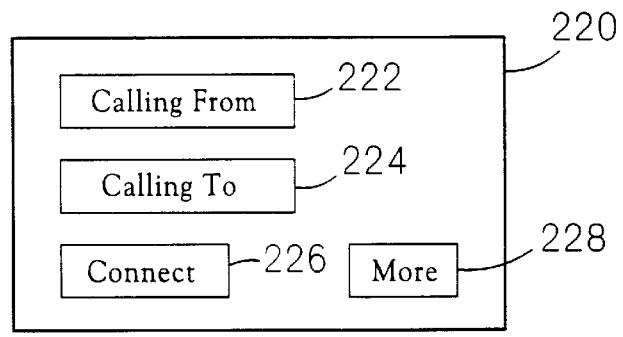
Figure 2:
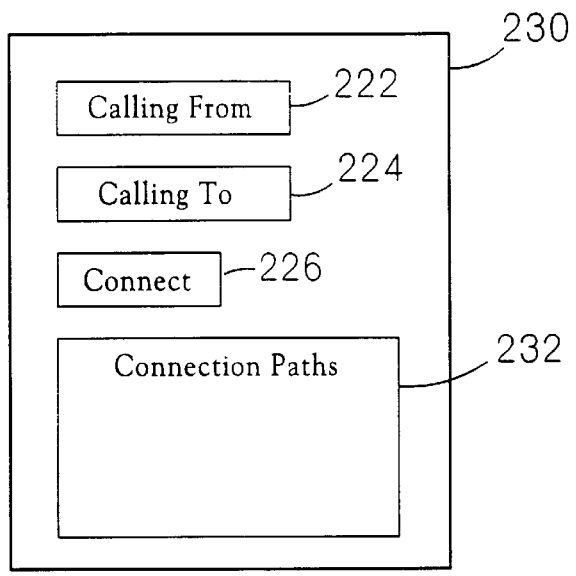

Referring to FIGS. 2(a–c), after a remote user initiates execution of a connection software system on remote computer 100, the user provides information to two, and possibly three interactive dialog boxes. In a first dialog box 210, shown in FIG. 2(a), the user provides a username 212 and a password 214. After the system accepts the information provided in dialog box 210, the user is presented with a second dialog box 220, shown in FIG. 2(b). The user provides information related to the location from which the user is calling 222 and information related to the point to which the user wants to connect 224. The "calling from" information 222 is typically a telephone number, including at least an area code, also known as a number plan area (NPA), and a telephone exchange within that area code. Rather than specifying a telephone number, the user can choose from a "pull-down" list of names associated with telephone numbers stored in the remote computer. The "calling from" entry can also be an indication that the remote computer is already connected to the Internet. The "calling to" information 224 is an identifier of a particular access point within corporate communication system 140 to which the user wants to be connected. For example, in a geographically distributed corporate communication system, the user may specify the particular location to which the user wants to be connected. Access points can be associated with an Internet address or a telephone number of a server computer coupled to corporate communication system 140. The "calling from" field 222 and the "calling to" field can each present a set of choices from which the user may select one, or the user can enter another value that is not in the set of presented choices. The choices are in part preconfigured into the system by an administrator of the system, and can also include recently used field values. For example, if a user is staying at a particular remote location for some time, the user may repeatedly use the same "calling from" telephone number. The "calling from" field also accepts other information related to the location of the remote location, such as dialing prefixes that are required to establish a telephone connection, and telephone services (such as call waiting) that should be disabled before establishing a data connection on the telephone line. Alternative user interfaces can also be used. For example, the dialog boxes shown in FIGS. 2(a) and 2(b) can be combined into one.

After the user has provided the information for the "calling from" field 222 and the "calling to" field 224, the user can initiate the connection procedure by using a "connect" button 226.

Alternatively, the user can press (e.g., activating using a mouse) a "more" button 228 to view information related to the connection that would be established if the user were to connect at that point. In response, as indicated in FIG. 2(c), possible communication paths identified by the connection software to couple remote computer 100 and the selected access point within corporate communication system 140 are presented in a list of connection paths 232. The list is sorted so that the first entry in the list is the path preferred by the connection software. Preference is based on a calculated cost for each of the paths, including both monetary and performance related factors. Each entry in the list includes path information, such as the ISP that would provide access to the Internet and communication characteristics, such as data rate. Depending on the configuration of the system, the list may include an indication of the cost of using that connection, and a user may be given the right to reorder the list, or to otherwise indicate that a path that is not the lowest cost path is his preferred choice. Having viewed, and possibly modified the order of connection paths 232, the user initiates the connection procedure by activating "connect" button 226.

After the connection procedure is initiated by the user, remote computer 100 tries to establish a connection using one of connections paths 232. The connection software is configured to prefer the path at the top of the list which, unless the user has reordered the list manually, correspond to the lowest cost path. If a connection is successfully established, the user can execute application programs on remote computer 100 that communicate with a local computer 110. For example, the user can use a database client application that interacts with a database server application executing on a local computer 110.

The system can encounter difficulty establishing a communication path. The connection software attempts to overcome the difficulty without user intervention. Some problems cannot, however, be corrected without the user intervention. For example, the telephone line may not be properly connected to remote computer 100. Depending on the nature of the problem, the user may be prompted to perform manual functions, such as checking a physical connection, or possibly inserting a disk containing software that needs to be loaded by the system.

In addition to the graphical interaction described above for establishing a connection, a user can perform the same functions using a previously defined script. The script is a text file that includes statements specifying the username and password values, the "calling from" and "calling to" values. The script can also include other statements that affect the selection of a preferred communication path, for example, by excluding a particular ISP. When the user executes such a script, the connection procedure is initiated in the same way as if the user had filled in the fields in the graphical interface and activates the "connect" button.

Figure 3:
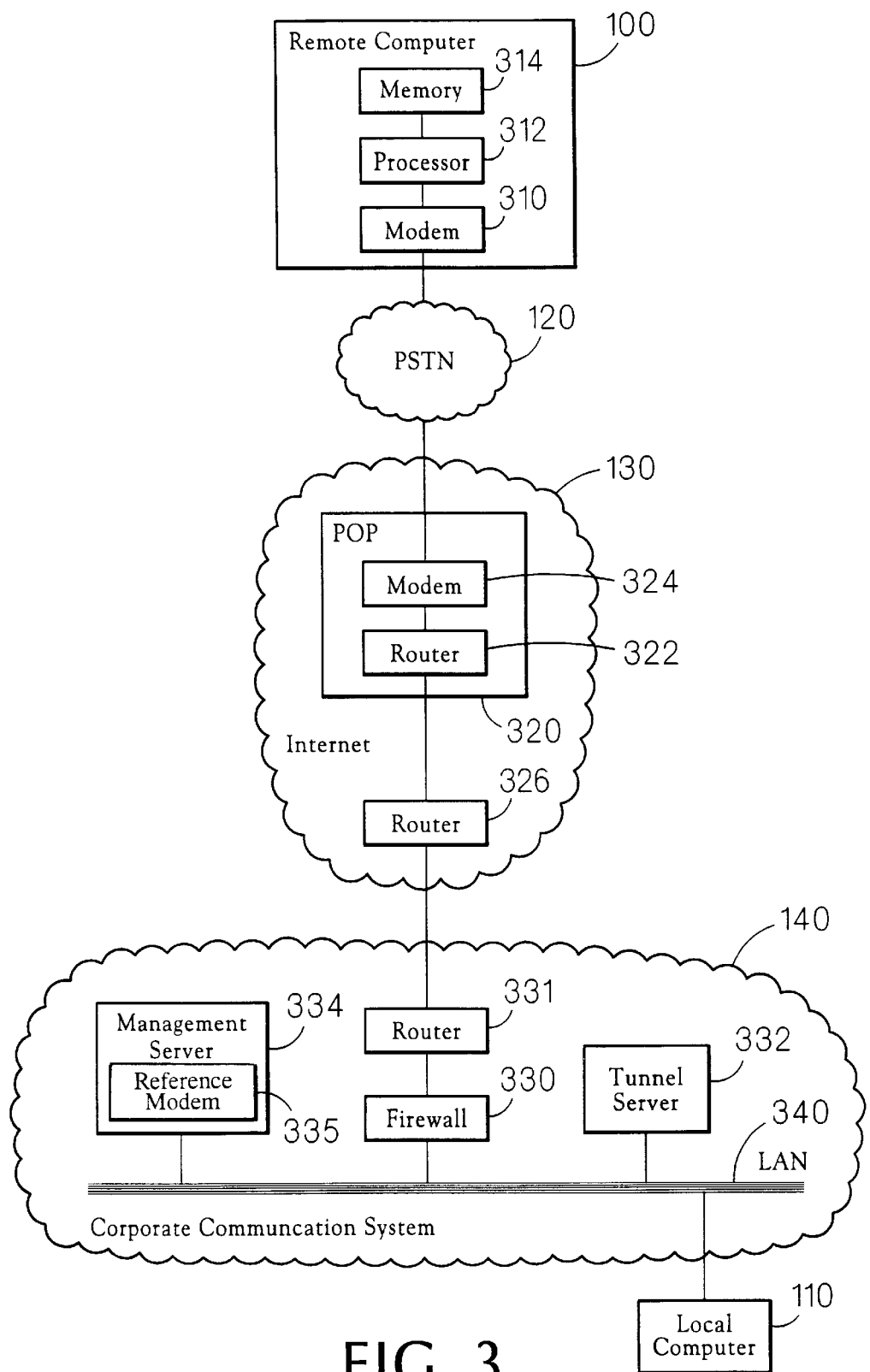
FIG. 3 is an exemplary connection path joining a remote computer and a local computer through a telephone network, an Internet, and a LAN.

Establishing a connection path between remote computer 100 and local computer 110 can involve several steps associated with establishing different segments of the path. FIG. 3 shows a representative communication path such as might be established between remote computer 100 and local computer 110. The path uses a dialed telephone connection from remote computer 100 to an Internet POP 320 and an Internet-based connection from POP 320 to local computer 110. The communication path includes several physical segments.

First, processor 312 on remote computer 100 communicates with modem 310 in remote computer 100, typically over an internal communication bus or a serial communication line. The modem is configured to be at a particular address, for example, an address associated with a particular communication port index. For example, in the Windows95 operating system, the modem may be configured to be accessible through the second communication port, known as "COM2".

Modem 310 is then connected to PSTN 120, either directly, or through a private switch (private branch exchange, PBX). Modem 310 provides dialing information to PSTN 120 which establishes a telephone connection to a modem 324 at an Internet POP 320. If modem 310 is connected through a PBX, it first provides a dialing prefix or telephone access code to the PBX in order to be connected to PSTN 120.

Modem 324 at Internet POP 320 is coupled to a router 322 at the POP, which provides a gateway to Internet 130. A data path through Internet 130 terminates at a second router 326 that couples Internet 130 and corporate communication system 140.

Corporate communication system 140 includes a local area network (LAN) 340. A firewall 330 is coupled to LAN 340. Firewall 330 is connected to router 326, for example over a high-capacity leased telephone line, and provides a gateway between Internet 130 and corporate communication system 140. Also on LAN 340 is a tunnel server 332 and a management server 334.

The communication path passes from router 326, through firewall 330 and onto LAN 340. It then passes into tunnel server 332, and then back over LAN 340 to local computer 110. Tunnel server 332 provides communication services to remote computer 100, including encapsulation of data passing between remote computer 100 and LAN 340, for example, within an IP-based data stream.

Management server 334 controls and provides services for software executing on tunnel server 332 as well as software on remote computer 100. For instance, a service provider on management server 334 authenticates the user and provides authorization information to tunnel server 332 and remote computer 100.

Establishing the representative communication path shown in FIG. 3 involves several steps. These steps include:

Controlling modem 310 from processor 312 in remote computer 100 to connect modem 310 to PSTN 120, get a dial tone, and dial a telephone number for connection to modem 324.

Completing a telephone (audio) connection between modem 310 and modem 324.

Establishing a raw data connection between modem 310 and modem 324 to provide bidirectional transfer of binary data streams between the modems.

Establishing communication between network-layer software executing on remote computer 100 and router 322 at POP 320. This step typically involves an authentication step in which remote computer 100 provides a username and password over the data path established in the previous step. Remote computer 100 can use various communication protocols depending on the capabilities of the POP being accessed. In this instance, the point-to-point protocol (PPP) is used to couple the IP-based network-layer software on remote computer 100 to router 322, thereby allowing the network layer software to send and receive IP-based communication through router 322.

Establishing an IP-based communication path between networking software executing on remote computer 100 and tunnel server 332. This requires proper routing of data from networking software on remote computer 110 to router 320, and from router 320 to router 326. Establishing communication between networking software on remote computer 110 and tunnel server software executing on tunnel server 332. In this instance, an enhanced tunnel protocol, which includes features of the Point to Point Tunnel Protocol (PPTP), is used. Alternatively, protocols such as L2TP and IPsec can be used to provide tunneling capabilities. This step involves authenticating the remote user. Once remote computer 100 is connected to tunnel server 332 and the remote user authenticated, the tunnel server software provides a service to networking software on remote computer 100 so that remote computer 100 can communicate on LAN 340 as if it were directly connected, using a variety of communication protocols, such as IP, IPX, and NetBUI. This type of connection is termed a "virtual private network" (VPN) because remote computer 100 is virtually on LAN 340.

Unfortunately, problems may be encountered at any of these steps. As will be discussed fully below, connection software executing on remote computer 100 attempts of overcome such difficulties without user intervention.

Other types of communication paths follow similar routes. A connection path through direct Internet access network 125 (FIG. 1) is similar to the path shown in FIG. 3. For instance, if direct Internet access network 125 is a CATV network, modems 310 and 324 are replaced with CATV modems, and PSTN 120 is replaced with the CATV network. The steps involved are also similar, except that a dialing step is not required because the cable modems are connected to each other when they power on.

Figure 4:
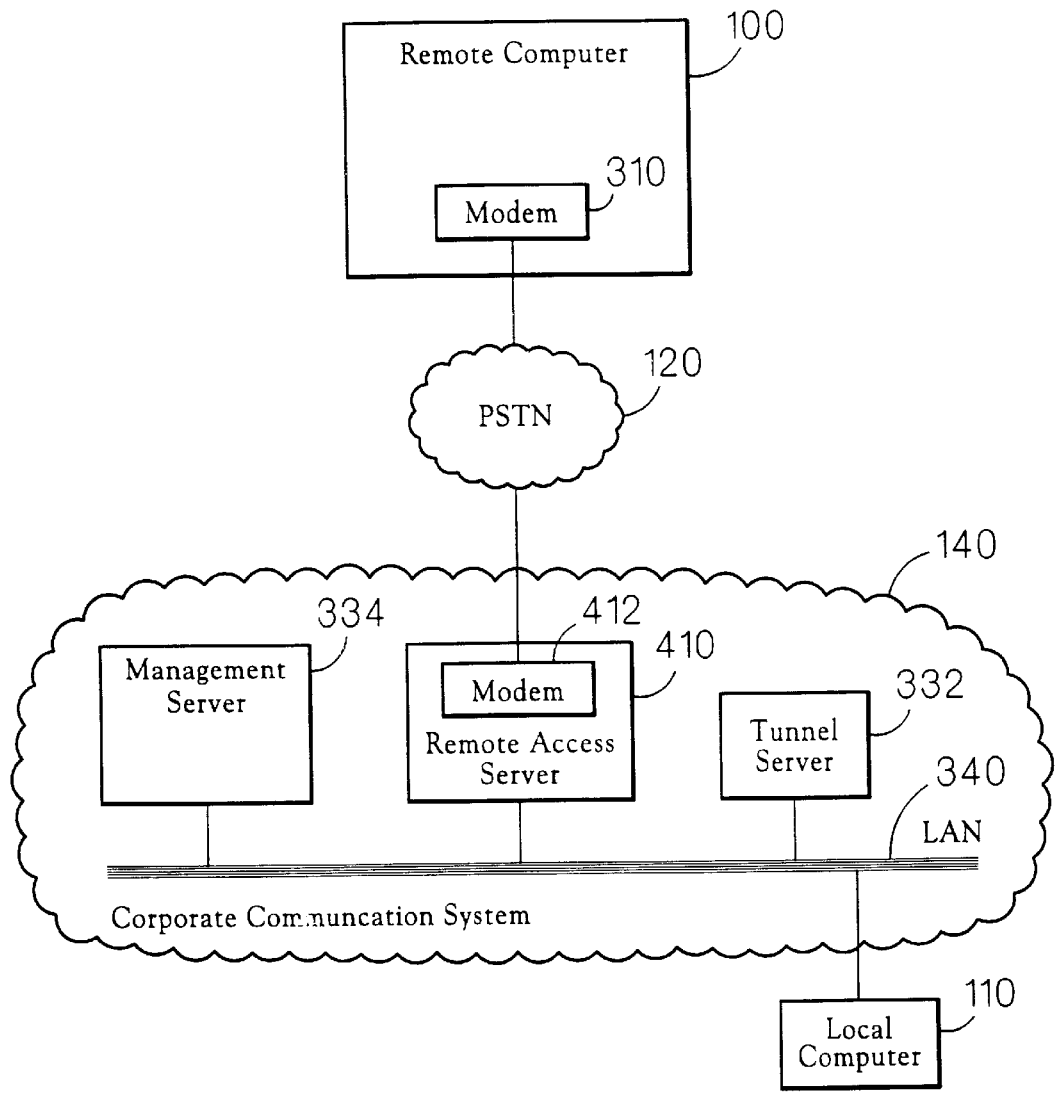
FIG. 4 is an exemplary connection path joining a remote computer and a local computer through a telephone network, and a LAN.

Referring to FIG. 4, remote computer 100 can communicate without using Internet 130 (depicted in FIG. 3). In this case, a dialed telephone connection terminates at a modem 412 at a remote access server 410. Remote access server 410 communicates directly with LAN 340. Communication between networking software executing on remote computer 100 and remote access software executing on remote access server 410 can use a variety of communication protocols depending on the capabilities of remote access sever 410. In this instance the remote access software uses PPP.

Other types of paths can also be supported but are not illustrated. For instance, a direct telephone connection between remote computer 100 and remote access server 410 can be used, whereby communication passes through tunnel server 332 before reaching local computer 110. Tunnel server can provide encryption or compression services that may not be available when using remote access server 410 alone.

Figure 5:
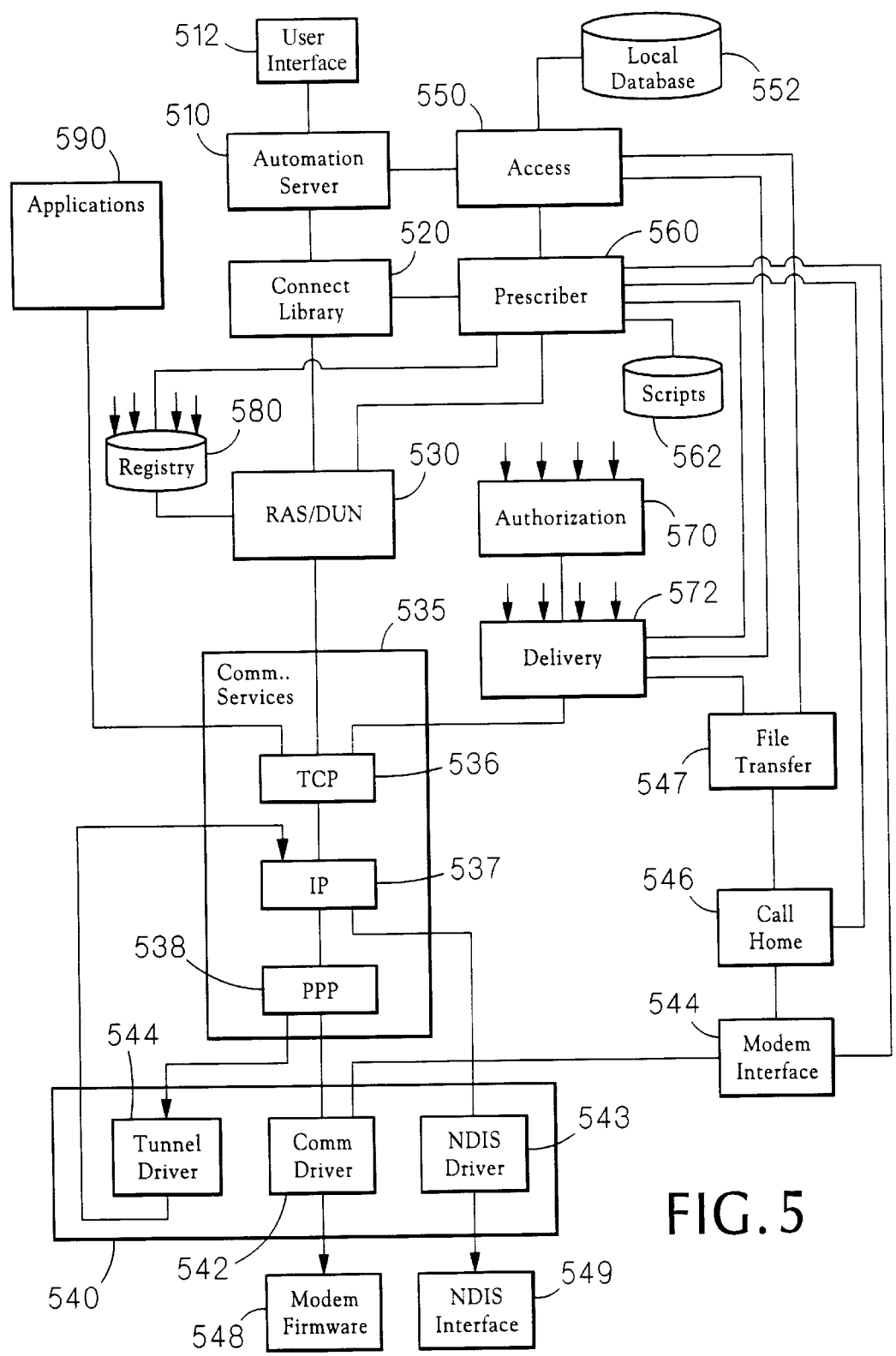
FIG. 5 shows software modules of connection software which execute on a remote compute.

Referring to FIG. 5, connection software executing at remote computer 100 (FIG. 1) includes several cooperating modules. At a low level, a modem includes modem firmware 548 that executes on a controller that is part of the modem hardware and implements various data communication protocols, and an NDIS interface 549 provides an interface to direct access network 125. Modem firmware 548 implements communication functions, including a capability to negotiate use of a compatible protocol with another modem to which it connects.

Communication services 535, applications 590 and other software modules interface with communication drivers 540. Communication drivers 540 include communication port drivers 542 execute on main processor 312 of remote computer 100 and provide a low-level interface to the modem firmware 548. An NDIS driver 543 provides a low-level interface to NDIS driver 549. A tunnel driver 544 provides both provides driver-level services to communication services 535, and makes use of communication service 535 to implement tunneled communication between remote computer 100 and tunnel server 332. Communication services 535 includes a transport layer module, TCP 536, and network layer module, IP 537, and a data link module, PPP 538. Tunnel driver 544 implements the enhanced tunnel protocol, ATN. Remote access services/dialup networking (RAS/DUN) module 530 controls the establishment of remote connections, making use of communication services 535. Once a remote connection is established, communication services 535 provide services directly to applications 590.

In the user interaction described above, the graphical user interface, and specifically the dialog boxes shown in FIGS. 2(a)–(c), are generated and controlled by a user interface (UI) 512. An automation server 510 interacts with UI 512 and coordinates user interaction and establishment of a connection, and later provides services if a connection is lost. A module, access 550, makes use of a local database 552 and provides information required by other modules. A principal function of access 550 is to provide automation server 510 with information needed to establish a connection path to corporate communication system 140. The automation server provides access information to a connect library 520. Connect library 520 uses services provided by RAS/DUN 530 in order to establish a connection. If connect library encounters errors while trying to establish a connection, it calls services in a prescriber 560 to try to resolve the errors. Prescriber 560 uses one or more scripts 562 that it interprets to determine the procedure by which it attempts to overcome the error.

The previously mentioned software modules access 550, authorization 570, and delivery 572, provide services to other software modules of the connection software. Access 550, in addition to computing the list of connection paths requested by automation server 510 and used by connect library 520, provides an interface to a distributed database. The distributed database has data stored both in a local database 552 as well as on management server 334. This database includes a variety of information, including user preferences. Authorization 570 provides authorization related services to other software modules. For example, authorization 570 accepts the username and password provided by the user, and provides those and related credentials to other modules that require them during the process of establishing and maintaining a communication path. Delivery 572 provides communication services between software modules executing on remote computer 100 and services that allow software modules executing on remote computer 100 to communicate with software modules executing on other computers, such as tunnel server 332 and management server 334. For instance, delivery 572 accepts logging information from other modules on remote computer 100 and sends that information to a centralized logging service provider executing on management server 334. Delivery 572 enforces a ring-based security mechanism (described below), and provides addressing and routing services for various modules. Delivery makes use of communication services 535 to communicate with other computers.

Note that not all data paths between various software modules and delivery 572 or authorization 570 are illustrated in FIG. 5. In particular, delivery 572 and authorization 570 also provide interfaces to modules including automation server 510, access 550, connect library 520, and prescriber 560.

A modem interface 544 provides low-level modem-based communication services to prescriber 560 and access 550. For example, in the event that RAS/DUN 530 is unable to establish a connection through communication services 535, prescriber 560 can attempt to diagnose the difficulty by accessing the modems through modem interface 544. Call home 546 also uses modem interface 544 to establish a communication path between remote computer 100 and management server 334. Access 550 and prescriber 560 can use file transfer 547, which in turn uses call home 546 to obtain data from management server 334 prior to establishing a network-based connection.

A registry 580 is used by many different software modules which execute on remote computer 100. Registry 580 is a file which includes various types of configuration and status information written by those modules. Prescriber 560 reads this information to determine information related attempted connections.

Figure 6:
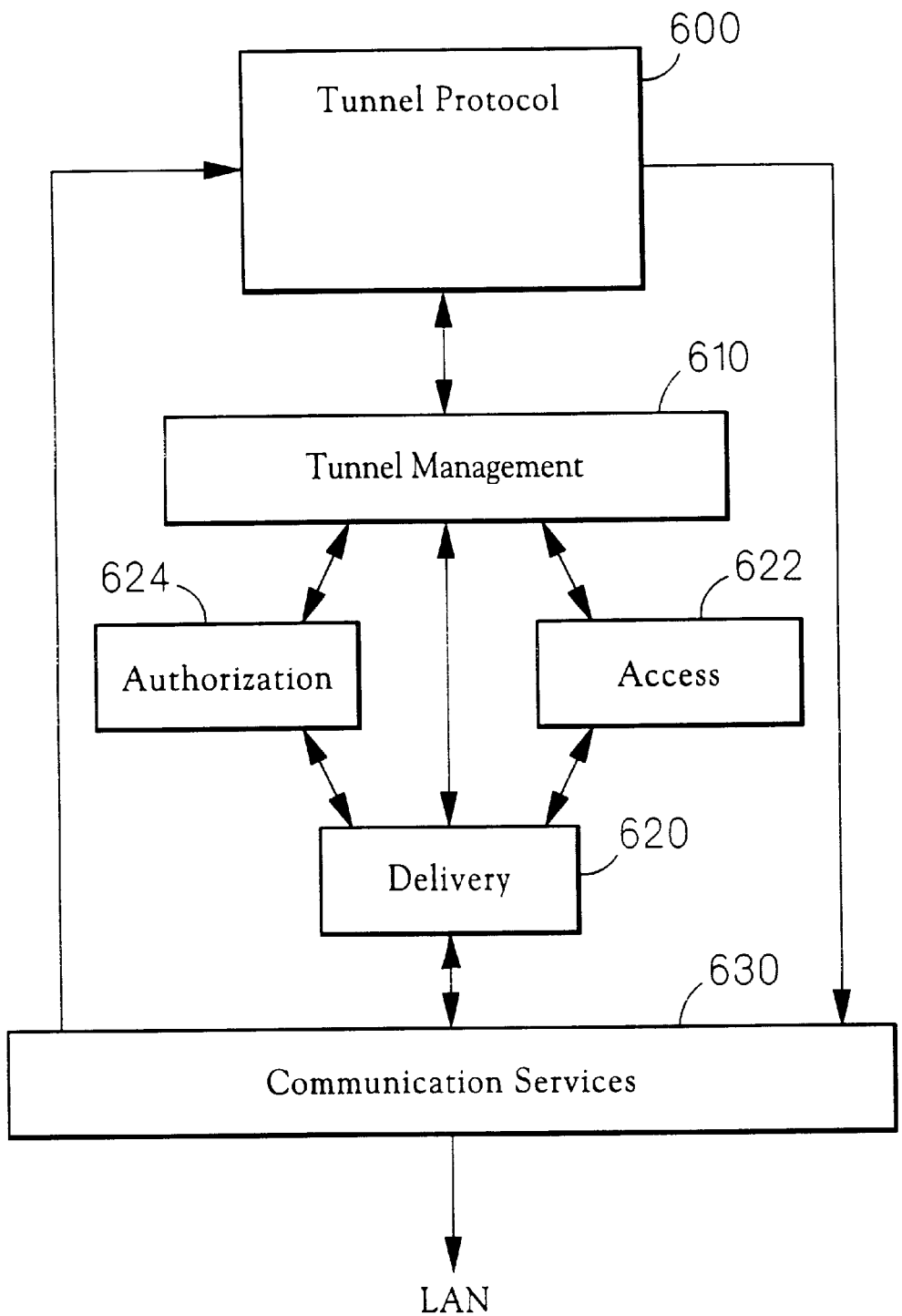
FIG. 6 shows software modules which execute on a tunnel server.

Referring to FIG. 6, software executing on tunnel server 332 (FIG. 3) includes several cooperating modules. Communication services 630 provides an interface for communicating over LAN 340 (FIG. 3). Tunnel protocol 600 accepts communication passing between remote computer 100 (FIG. 3) and a local computer 110 (FIG. 3) from communication services 630. Tunnel protocol 600 processes the communication, including, for example, encapsulation, compression, encryption, and prioritization. Tunnel protocol 600 then passes the processed communication back through communication services 630 to its destination. Also on tunnel server 332 is a software module, tunnel management 610, which is responsible for setting up and managing connection paths passing through tunnel protocol 600. Tunnel management 610 uses authorization 624, access 622, and delivery 620. Authorization 624 and access 622 rely on delivery 620 to communicate with service provider modules that reside on other computers.

When remote computer 100 communicates with management server 334 through tunnel server 332, that communication passes through tunnel protocol 600. Other communication, such as communication from local computer 110 to remote computer 100 also passes through tunnel protocol 600. Tunnel protocol 600 provides a prioritization service. In particular, management server 334 provides data for access 550 on remote computer 100 in order that access 550 can keep local database 552 up to date. This update information is requested by access 550 and is sent as a background activity, in a manner that minimizes the impact on other communication between remote computer 100 and, for example, local computer 110. Data sent from management server 334 to tunnel server 332 can be tagged as having a lower priority than other communication destined for remote computer 100. Tunnel protocol 600 implements sends higher priority messages to remote computer 100 in preference to messages tagged with a lower priority. In this way, transfer of information to update local database 552 does not appear to impact communication between applications 590 and, for example, local computer 110.

Figure 7:
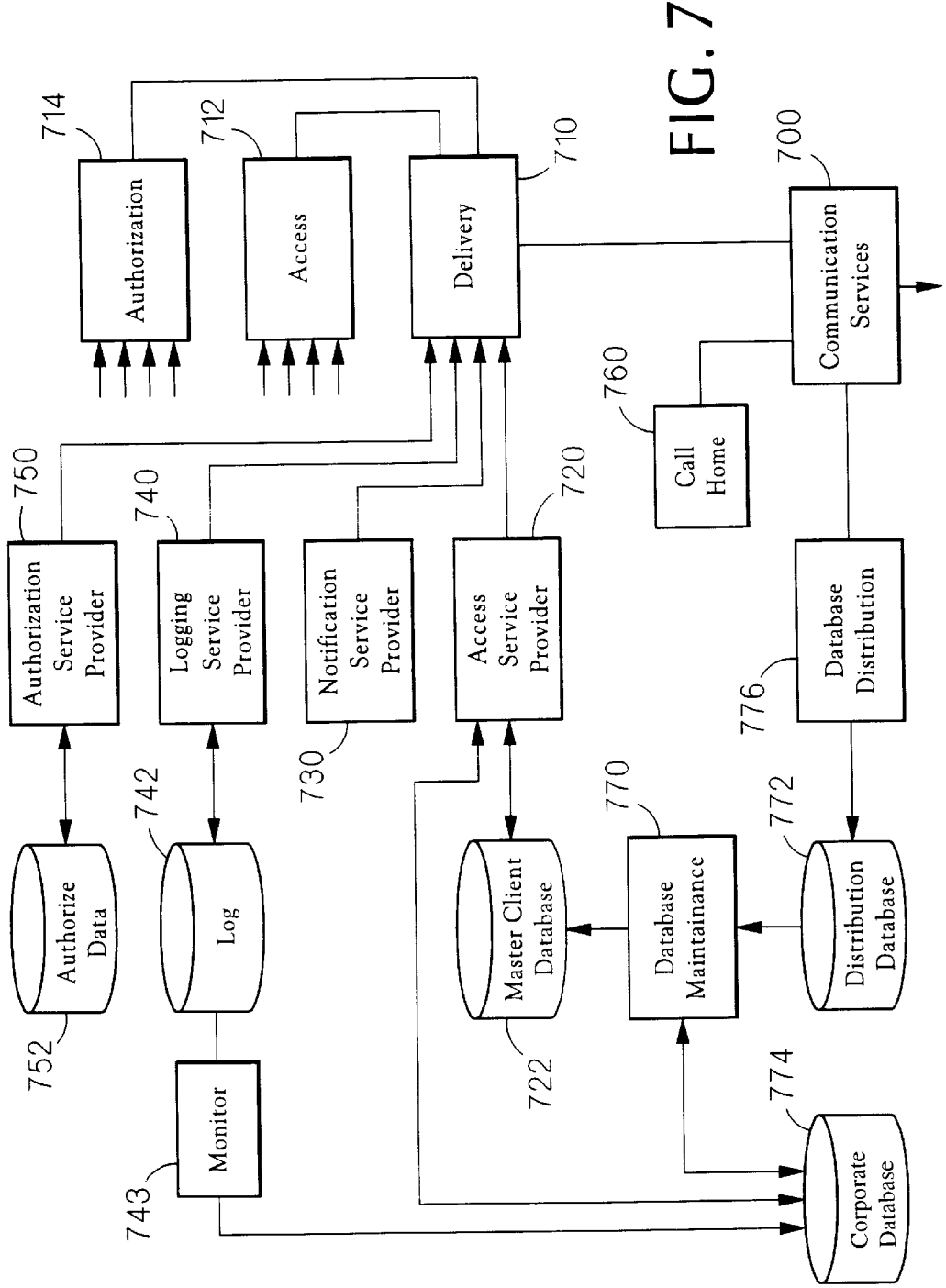
FIG. 7 shows software modules which execute on a management server.

Referring to FIG. 7 software modules on management server 334 (FIG. 3) include service providers for service modules on the management server and on other computers, service modules that provide access to service provider modules, and modules for configuring and administering software on management server 334, on tunnel server 332, and on remote computer 100. Authorization 714, access 712, and delivery 710 provide services in a fashion similar to that of the corresponding service modules on remote computer 100 and tunnel server 332. Communication services 700 provide an interface for delivery 710 to communicate with other computers.

Service providers that execute on management server 334 include an access service provider 720. Access service provider 720 accesses a master client database 722 and corporate database 774. Access modules, such as access 712, access 622 on tunnel server 332, or access 550 on remote computer 100, communicate with access service provider 720 in order to retrieve data in master client database 722 and to store and retrieve data in corporate database 774. Master client database 722 includes data needed to select a lowest cost connection path from a remote computer 100.

An authorization service provider 750 maintains authorization related information in authorization database 752. For instance, authorization database can include usernames and passwords for those users. Authorization service provider 750 can also provide an interface to other authorization or authentication services that can execute on the management server or on other computers.

A logging service provider 740 provides a centralized mechanism for tracking behavior of various software modules on computers, such as on one or more remote computers 100. This logged information is stored in a log 742. A monitor 743 can process the information in log 742 and use this information to update corporate database 774. For example, if a particular access path has repeatedly been inaccessible to remote computers, the telephone access number for that path may be given a very high cost so that remote computers avoid needlessly trying to connect through that access number.

A notification service provider 730 provides a mechanism for alerting appropriate people or software services when an urgent situation occurs. For example, a software failure on tunnel server 334 may require immediate attention. Notification service provider 730 can also provide an interface to an external help desk system, for example by accessing a help desk database directly, or communicating through a standard interface to a help desk software system.

Master client database 722 includes information needed to select a lowest-cost connection path from a remote computer 100 to corporate communication system 140. This information is configured by database maintenance 770 using a distribution database 772, which does not necessarily contain information specific to the particular corporation, and a corporate database 774 which contains information that is specific to that corporation. Specific information includes assignment of users to particular user groups, connection policy information for those user groups, and connection information such as telephone access numbers for remote communication servers or POPs not included in distribution database 772. Distribution database 772 is obtained by database distribution 776, for instance by a file transfer from a centralized server on the Internet. Alternatively, distribution database 772 may be provided by distribution of physical media, such as CD-ROMs.

In operation, software modules on a remote computer 100, on a management server 334, and on a tunnel server 332 cooperate to establish a connection path between remote computer 100 through tunnel server 332 to a local computer 110. Software modules communicate through a management communication channel maintained by the delivery service modules on the various computers involved in a connection. This management communication channel provides a secure means of coordinating the distributed software modules.

Figure 8:
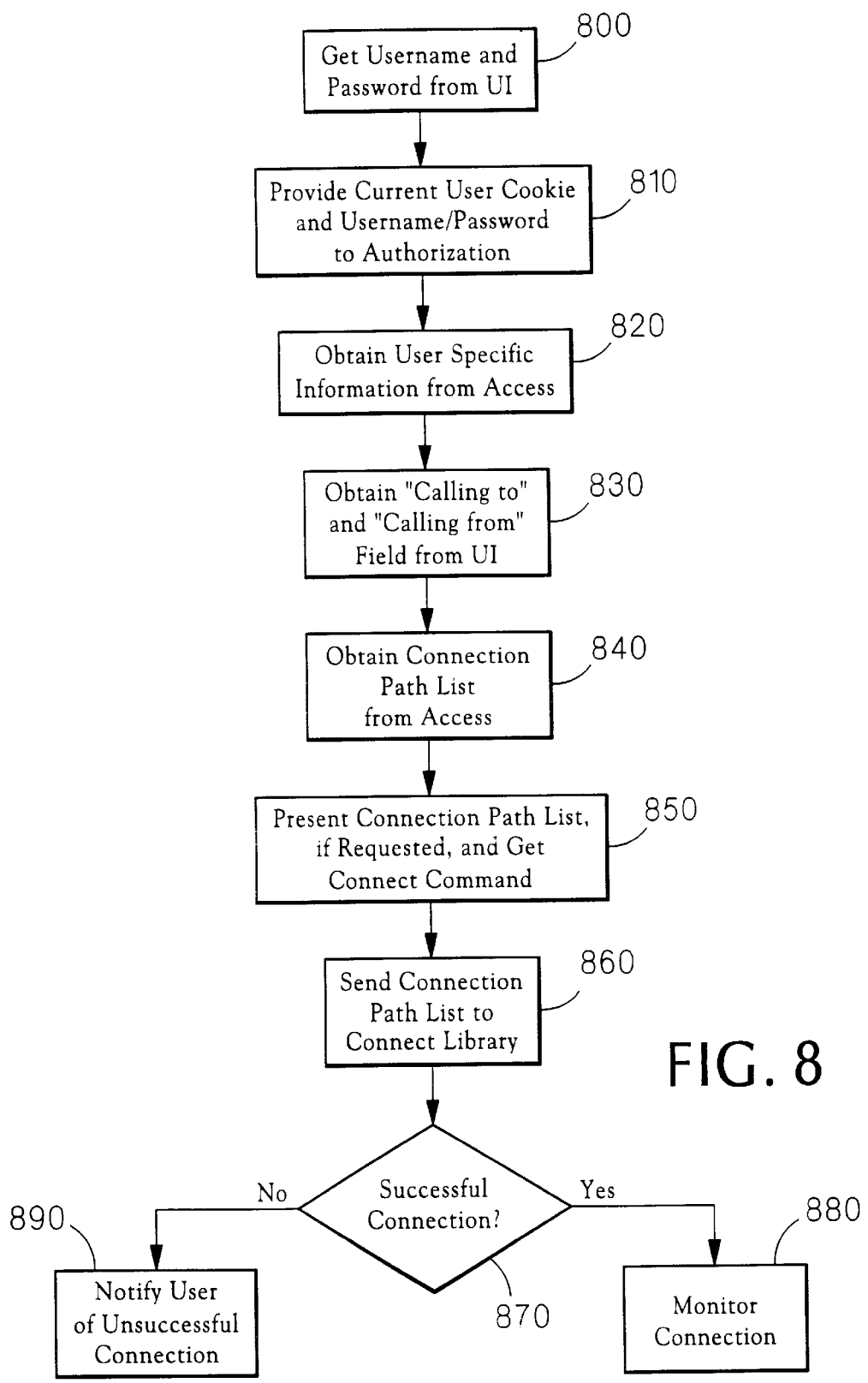
FIG. 8 is a flowchart of a connection procedure used by an automation server on a remote computer.

Referring to the flowchart in FIG. 8, and to the software modules shown in FIG. 5, operation of automation server 510, which executes on remote computer 100, follows a sequence of steps when attempting to establish a connection path for a user. First, the automation server accepts the username and password of the user through user interface 512 (step 800). Automation server 510 provides this username and password, an example of "credentials" for the user, to authorization 570, along with an identifying number, or "cookie", for that user (step 810). Authorization 510 records this association of a cookie and credentials in a credential cache stored in working memory on the remote computer. The cookie is passed along with each request to other modules to identify the particular connection for which the request is being made. Automation server 510 passes the username and cookie to access 550. Access 550 provides, in return, user-specific information for that user (step 820). Access 550 retrieves the user-specific information from a local database 552, which contains a portion of the data stored in master client database 722 (FIG. 7) stored on management server 334 (FIG. 3). Automation server 510 uses the user-specific information, for instance, to provide defined choices in the "calling from" and "calling to" fields in the dialog box shown in FIG. 2(b). After automation server 510 receives the "calling from" and "calling to" information from the user (step 830), it passes this information to access 550 which, after computing the costs of various possible connection paths, provides a list of connection paths to automation server 510 sorted by increasing cost (step 840). Automation server 510 provides the sorted list of connection paths to connect library 520 and requests that a connection be established using one of the paths (step 850). If connect library 520 successfully makes a connection (step 870), automation server 510 enters a mode in which it monitors the connection (step 880) waiting, for instance, for the possibility that the connection is unexpectedly terminated. If no connection can be established, automation server 510 notifies the user (step 890).

Figure 9:
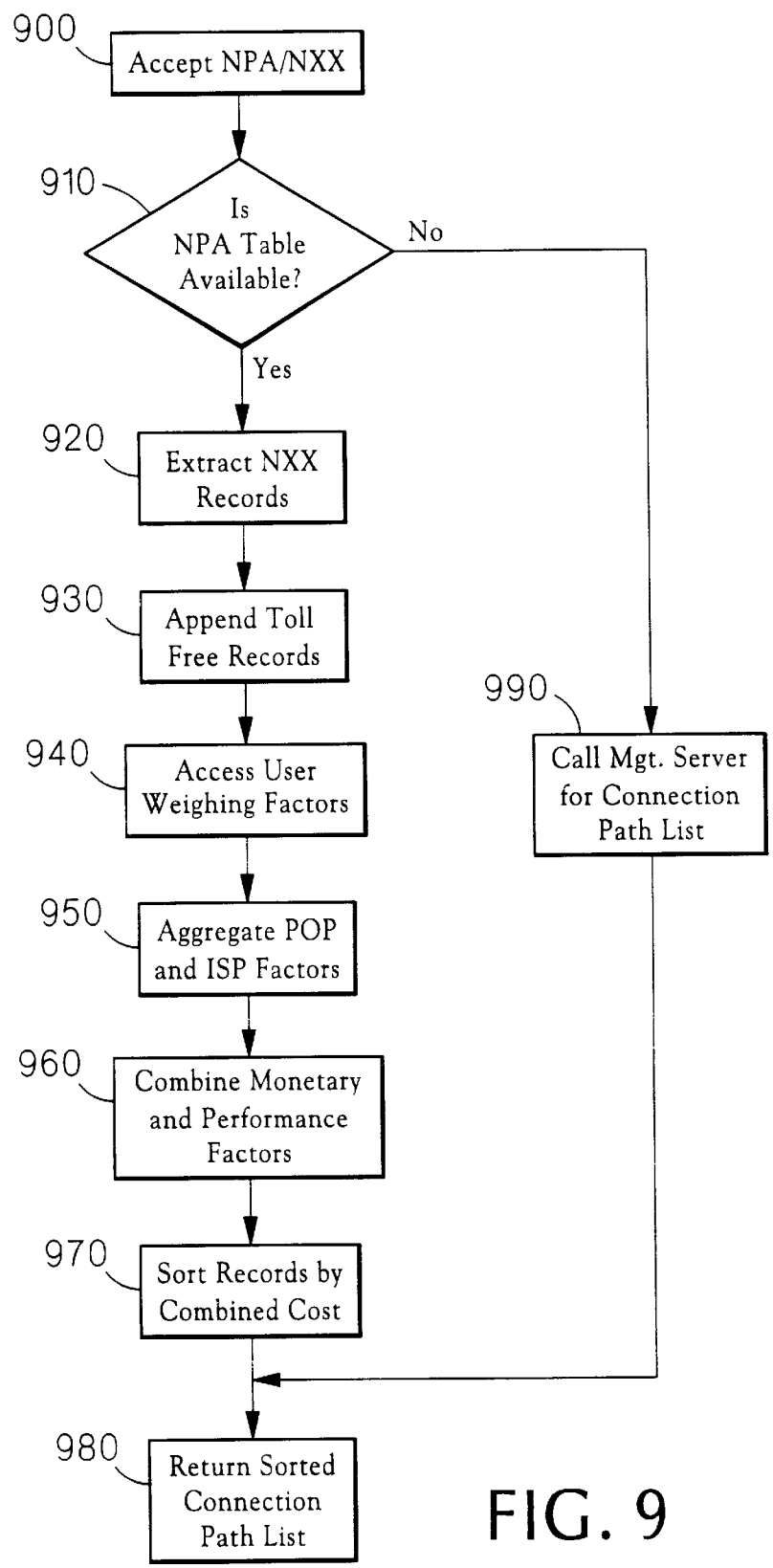
FIG. 9 is a flowchart of a procedure used by an access module on a remote computer to assemble a list of connection paths.

Referring now to the flowchart in FIG. 9, when access 550 accepts the area code and exchange (NPA/NXX) of the "calling from" field from automation server 510 (step 900), it executes a series of steps to determine the sorted list of connection paths to return to the automation server. First, access 550 determines whether it has all of the necessary information, including an NPA table for the specified area code, stored in local database 552 for that area code (step 910). If it does, it accesses that information and extracts the records associated with the specified exchange (step 920). These records identify the local telephone connections to POPs or remote access servers the user can make from his location. Access 550 then appends records identifying toll-free telephone connections to POPs or remote access to this list (step 930). Each of the local and toll-free records includes performance and monetary cost factors for both the particular POP or access server associated with a connection, as well as for the ISP that operates that POP. Access 550 aggregates and combines these factors in a user-specific manner. It next retrieves user-specific weights for these factors from local database 552 (step 940). Access 550 next aggregates the ISP and POP factors according to the user-specific weights (step 950) and then combines the aggregated monetary and performance factors to determine a single numeric cost for each connect path (step 960). Access 550 then sorts the list of connection paths (step 970) and returns the sorted list to automation server 510.

If access 550 does not have an NPA table for the specified area code (step 910), it makes a telephone connection to management server 334 using call home 546 and requests that the management server compute the connection path list (step 990). A corresponding call home 760 and access 712 (FIG. 7) on management server 334 compute the list and return it to remote computer 100 over the dialed telephone connection. Access 550 accepts the sorted list, and returns the sorted list to automation server 510 as before (step 980).

Figure 10:
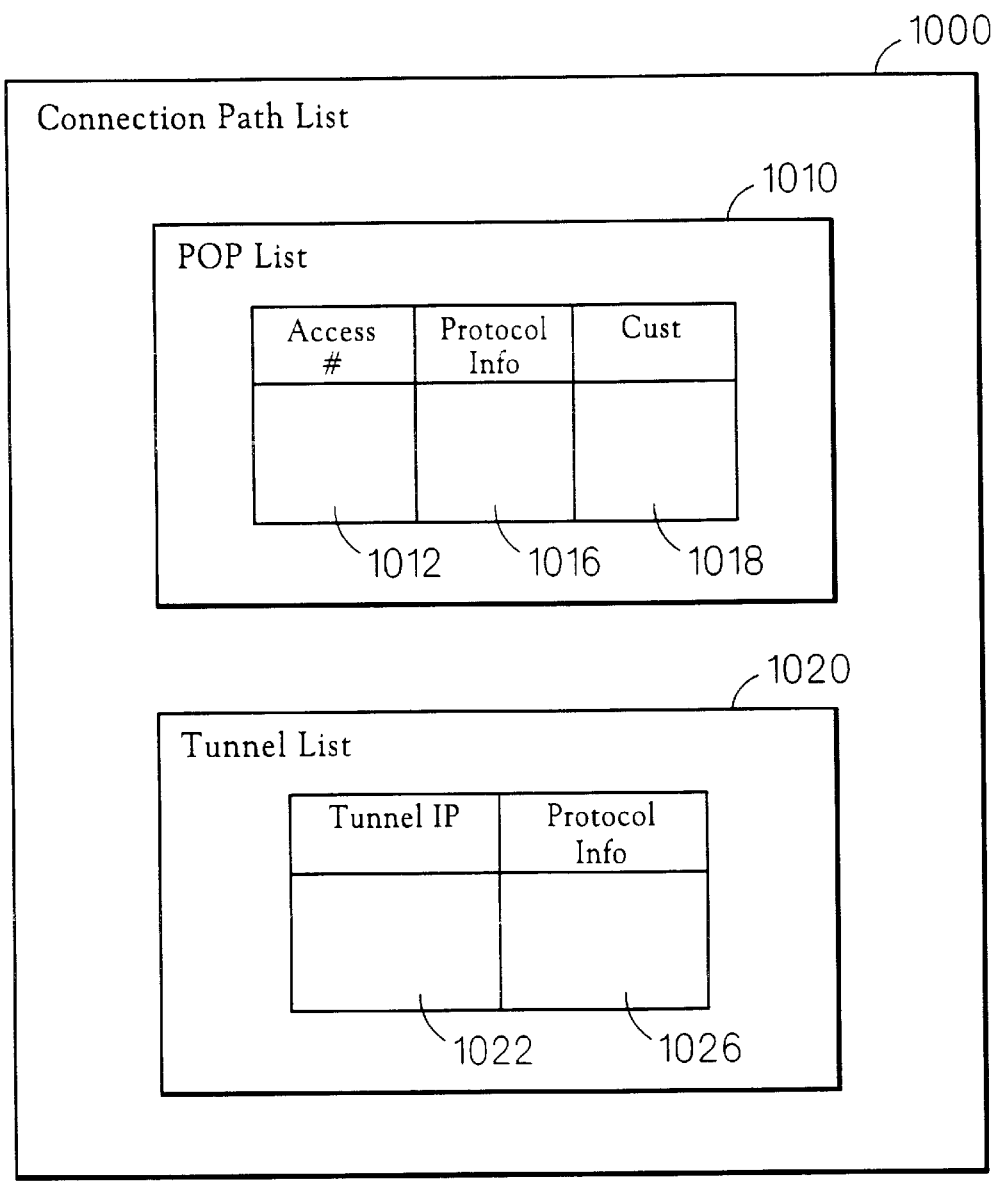
FIG. 10 shows data structures of a connection path list assembled by an access module on a remote computer.

Referring to FIG. 10, connection path list 1000, which is generated by access 550, includes two tables. The first table is a POP list 1010, which includes a list of records sorted by their associated costs. Each record includes a telephone access number 11012, information related to communication protocols to be used 1016, and cost information 1018, including multiple monetary and performance cost factors, of using that path. The second table in connection path list 1000 is a tunnel list 1020 that indicates a sorted list of tunnel servers that can be used. Each tunnel server record includes the IP address of the tunnel server 1022, and information related to communication protocols to be used 1026.

Figure 11:
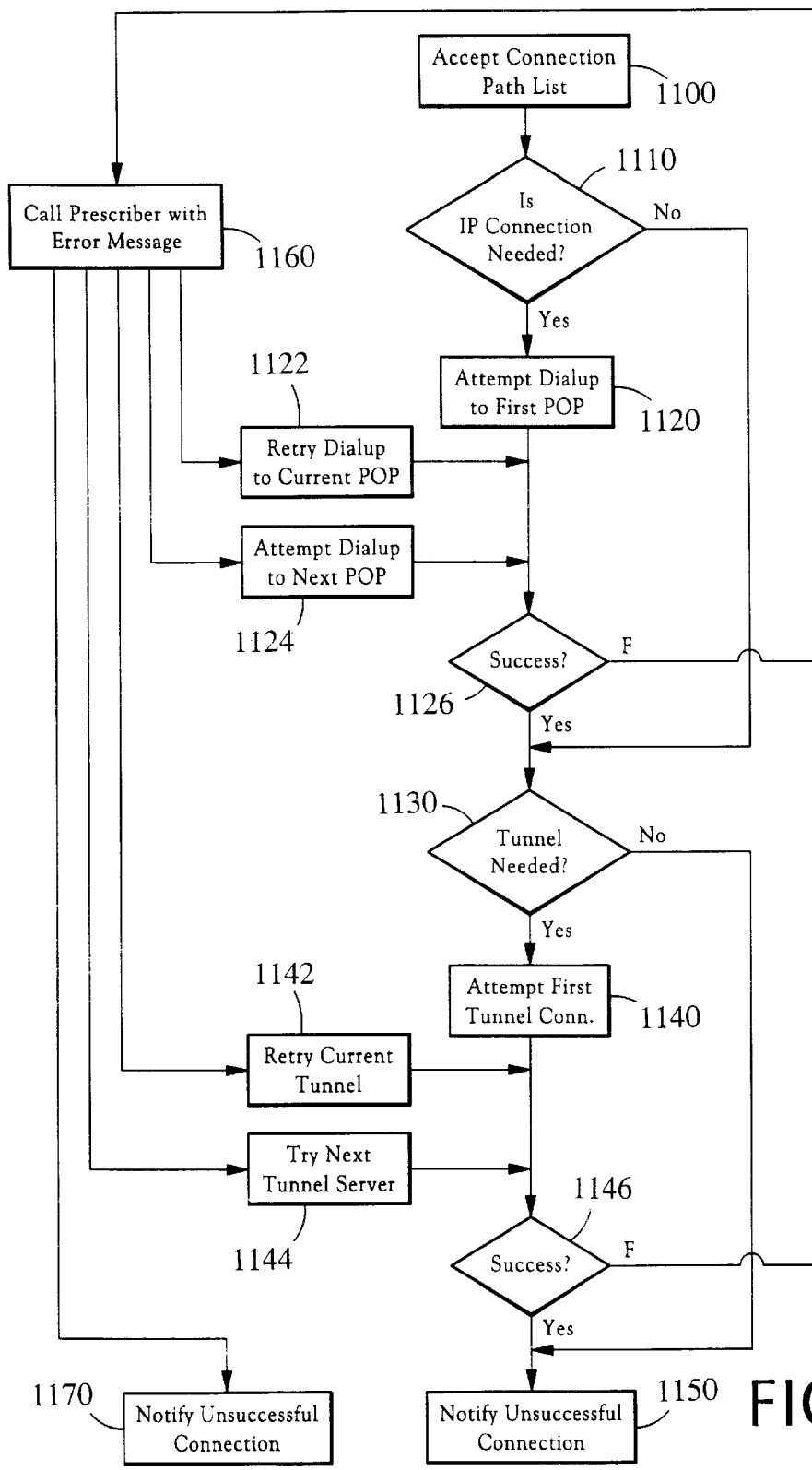
FIG. 11 is a flowchart of a connection procedure used by a connect library on a remote computer.

Referring to the flowchart in FIG. 11, when automation server 510 provides the connection path list to connect library 520 (step 850 in FIG. 8), connect library 520 performs the series of steps shown. After connect library 520 accepts the connection path list (step 1100), it first determines whether remote computer 100 already has an IP connection to Internet 130 (step 1110). For example, the user may have previously made a telephone connection to a POP, or the remote computer may have an IP connection through a CATV modem.

If the remote computer does not already have an IP connection to the Internet, connect library 520 initiates a dialup procedure to the telephone number of the first POP in pop list 1010 of connection path list 1000 (FIG. 10) (step 1120). Connect library 520 initiates this dialup procedure by creating a temporary connection record indicating the POP number, and the credentials needed to establish a connection to that POP, and storing this record on disk. Connect library then requests from RAS/DUN 530 that it attempt to establish a connection using the stored temporary connection record.

RAS/DUN 530 is a component of the Microsoft Windows95 operating system. Direct user interaction by RAS/DUN 530 is inhibited, or at least hidden from the user. Connect library 520 controls RAS/DUN 530 and instructs it to use the temporary connect record it has just written to disk. RAS/DUN 530 attempts to make the telephone connection, as well as the network connection, using the specified protocol, such as PPP. RAS/DUN 530 uses the credentials stored in the temporary connect record to establish the network connection that provides access to the Internet through the POP identified in the temporary connect record.

If the connection to the Internet through the first POP succeeds (step 1126), that is, RAS/DUN 530 returns a successful status message, connect library 520 next determines whether a tunnel connection is needed (step 1130) by checking whether tunnel list 1020 (FIG. 10) includes any entries. If a tunnel connection is required, connect library 520 creates a second temporary connection record indicating the desired tunnel server and credentials needed to connect, and requests from RAS/DUN 530 that it attempt to establish a connection using the second temporary connection record. If a tunnel connection is not required (step 1130) or if a tunnel connection is successfully established (step 1146), connect library 520 provides automation server 510 with a notification of the successful connection (step 1150).

If RAS/DUN 530 fails to make a connection to a POP (step 1126) or fails to make a tunnel connection to a tunnel server (step 1146), connect library 520 receives an error message from RAS/DUN 530, and connect library 520 in turn passes the error message to prescriber 560 which attempts to resolve the problem encountered. When prescriber 560 returns, one of several courses of action are taken by connect library 520 based on the returned information from prescriber 560. First, the connection that failed can be retried (steps 1122, 1142) or the next connection in POP list 1010 or tunnel list 1020 can be tried (steps 1124, 1144), or if all the connection paths have been exhausted, connect library 520 notifies automation server 510 that the connection was unsuccessful (step 1170).

Referring again to the procedure shown in the flowchart of FIG. 9, access 550 extracts connection path records associated with a particular area code and exchange (step 920) and connection path records associated with toll-free calls (step 930). Access 550 extracts these records from data stored in local database 552 (FIG. 5). The data is arranged in a manner that is both compact and permits rapid searching, as is described in more detail below.

Figure 12:
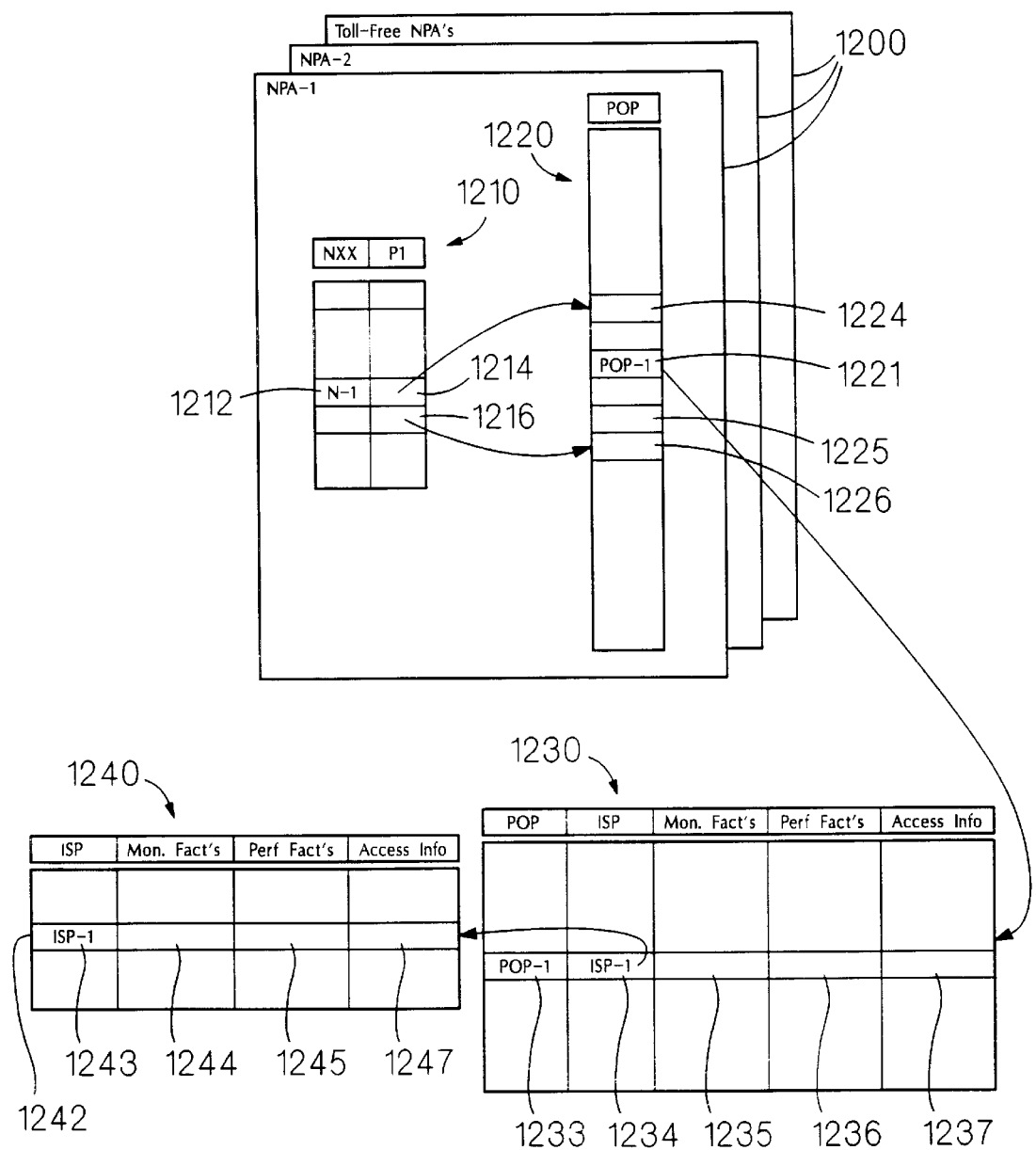
FIG. 12 shows data structures used by an access module on a remote computer to assemble a list of connection paths.

Referring to FIG. 12, data stored in local database 552 includes three types of files used to determine possible connection paths. For each area code (NPA), an NPA file 1200 identifies all the POPs that can be accessed by local calls for exchanges (NXX) in that area code. Such an NPA file includes two sections. The first section is an exchange index 1210. For any exchange in that NPA, exchange index 1210 provides an index into a second table that identifies the POPs that can be called using a local call from that exchange. The second section of NPA file 1200 is a POP list 1220, which is a list of identifiers (keys) for POPs that can be called using local calls. For example, in order to determine a set of keys for POPs that can be called locally from a area code/exchange NPA-1/N-1, access 550 accesses the NPA file 1200 for NPA-1. Then, using exchange index 1210, access 550 scans through the list of exchanges until it reaches the entry for exchange N-1 1212. The corresponding index 1214 provides a starting point in POP list 1220 for POPs to which local calls can be made from area code NPA-1 and exchange N-1. Access 550 uses the starting index for the next exchange 1216 to determine the end of the list of POPs in POP list 1220 that correspond to exchange N-1. In order to reduce disk storage used by the NPA files, each NPA file 1200 is compressed. The file name of each NPA file includes the area code for which that NPA file holds data. Based on the NPA needed, a required NPA file is located by its file name, and decompressed as needed.

An NPA file is also included for toll-free calls, although only a POP list is included in that NPA file. The POPs listed in the toll-free NPA file can be called without toll charges regardless of the exchange the user is calling from.

An alternative embodiment extends the structure of the NPA files to support dialing from countries outside North America. The function of an NPA (area code) field is replaced with two variable length fields, a country code, and a city code. For North America, the dialing country code is "1" and the city code corresponds to the area code. For other countries, the country code can be a variable number of digits, as can the city code within that country. For each country code, a country directory is used to hold a set of international NPA files similar in structure to those shown in FIG. 12, with the directory name being determined from the country code. Within a country directory, one NPA file is used for each city code, with the file name of that NPA file being determined from the city code. Within an NPA file, the NXX field can be variable length prefixes within that city. Note also that for each country code, a separate toll-free NPA file is stored in the country directory.

Having obtained a set of POP keys from POP list 1220, access 550 obtains detailed information associated with those POPs from two additional files, a POP table 1230 providing POP-related information, and an ISP table 1240 providing ISP related information. Detailed information associated with a representative POP with key POP1 1221 is stored in a record 1232 in POP table 1230. This record includes an ISP identifier 1234 of the ISP which operates the POP, as well as monetary factors 1235 and performance factors 1236 associated with a connection path through that POP. The record also includes access information 1237 that can include the telephone access number of the POP and other protocol information needed to establish a connection using that POP. ISP identifier 1234 is used to locate a record 1242 associated with the ISP that operates that POP. ISP record 1242 includes monetary factors 1244 and performance factors 1245 associated with using a connection through any POP operated by that ISP. The ISP record also includes access information 1247 that can include a username and password for establishing connections to POPs operated by that ISP.

The monetary and performance factors stored in records of ISP table 1240 and POP table 1230 are numbers that represent a level for each factor. Examples of monetary factors include the charge to initiate a connection through an ISP, and a per hour usage charge. A record of ISP table 1240 can also include information related to a threshold cumulative connection time beyond which a monetary factor is applied. This is used, for example, in the case that an ISP provides a number of includes connection hours each month, beyond which an hourly connection charge applies. Local database 552 is used to store the accumulated time in each period that is used to determine whether the threshold has been exceeded. Examples of performance factors include a speed factor which is a higher number for slow data rate connections, a delay factor which is a high number for connections that suffer high latency in delivery of packets, and an error factor which is high if a large number of data packets are lost in transmission. In other words, the monetary and performance factors enable one to computer a relative cost associated with using a particular POP. Note that both the POP and the ISP can have performance factors associated with them. For example, a POP's error factor may be the result of poor telephone service to the POP resulting in corrupted data transmissions between a remote computer and a POP, while an ISP may have a high error factor due to use of an overloaded backbone in the Internet resulting in packets being dropped at intermediate nodes in that backbone network. Also, monetary factors may depend on a POP. For instance, a POP accessed through a toll-free telephone number may have a surcharge over another POP operated by that ISP which is accessed by non-toll-free telephone calls.

Local database 552 (FIG. 5) also contains information about user groups, including the user group to which a user of the remote computer belongs. That user group has, in general, its own set of weighting coefficients for combining the various monetary and performance factors to compute a single overall cost for a connection. A first pair of weights is used to combine the POP factors and the ISP factors. For example, selection of connection paths for a user group may put more weight on ISP factors than POP factors. A second set of weights for that user group is associated with the set of monetary and performance factors, with one weight being associated with each factor. These factors are used to multiply and sum the monetary and performance factors to compute an overall total cost of a connection.

Local database 552 also includes information that provides the Internet hostname or IP address of tunnel servers used to connect to particular destinations. The "calling to" field provided by the user is used to determine whether a tunnel server is needed, and, if one is needed, the one or more tunnel servers that can provide access to the "calling to" destination. Associated with each tunnel server is access information including information used to determine the type of tunnel connection that should be established, such as the tunnel protocol, and various encryption and compression options.

Figure 13:
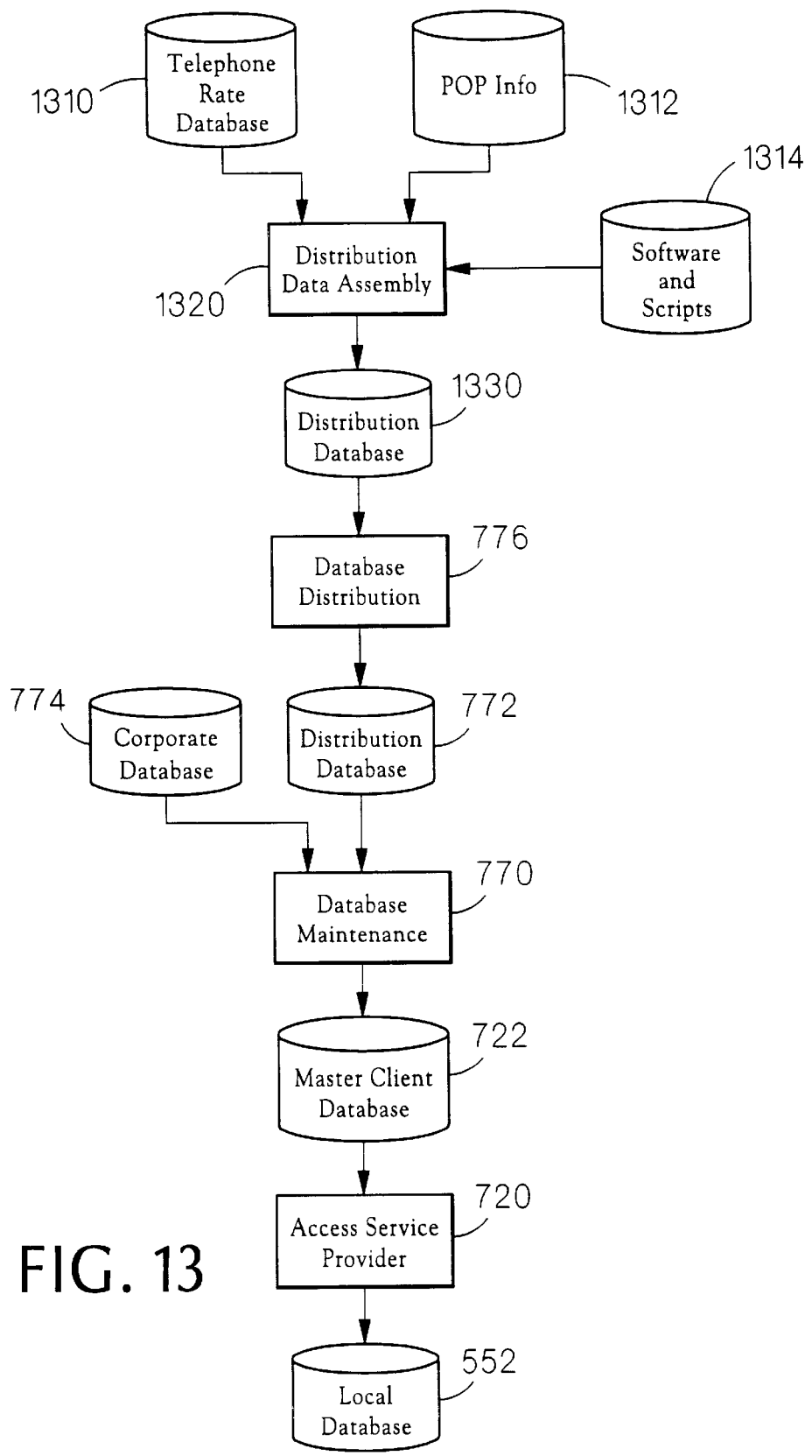
FIG. 13 illustrates the process of computing and distributing data used by an access module to compute a connection path list.

NPA tables 1200, POP table 1230, and ISP table 1240, together termed the dialing tables, are computed at management server 334 and transferred to remote computer 100 at the request of access 550. The process of creation of these tables is shown in FIG. 13. This process is performed on a multiple computers as is described below.

Referring to FIG. 13, the first stage in computing the dialing tables uses a telephone rate database 1310 and a POP information database 1312. This stage is performed at a centralized location, serving many different corporations, such as a centralized server computer on the Internet 130. Also incorporated into distribution database 1330 is information from software and scripts 1314 that can include prescriber scripts and software updates for modules on remote computers. This database assembly stage does not incorporate corporation specific information. Telephone rate database 1310 is a database, such as one provided by the Center for Communication Management Information (CMMI) which includes sufficient information for telephone companies to price domestic telephone calls in the U.S. and Canada based the source and destination telephone numbers. One aspect of this information relates to definition of local calling areas. A local calling area for a source telephone number defines the destination telephone numbers for which no toll charges are applied by a telephone company handling the call. The structure of the data provided in telephone rate database 1310 is described in more detail below. POP information database 1312 includes information related to ISPs and the POPs that they operate. In particular, for each ISP, telephone access numbers the POPs operated by that ISP are listed. In addition, data rate and pricing information associated with each telephone access number is also included.

Distribution database assembly 1320, a software process that executes on a centralized server computer, takes local calling information from telephone rate database 1310, and information in POP information 1310 and creates a set of relational database tables, the format of which is described below. These tables are transferred to management server 334 over the Internet and accepted by database distribution 776 (FIG. 7) executing on the management server. Database distribution 772 creates a local copy of distribution database 772 which is stored on management server 334.

A second database on management server 334, corporate database 774, includes information specific to the corporation. Corporate-specific information related to the dialing tables includes ISP and POP information that is not part of POP information 1312. For instance, a corporation may use a regional ISP that is not represented in POP information 1312. Also, telephone access numbers for remote access servers operated by the corporation are not included in distribution database 772 and are included in corporate database 774. Also, pricing information for various ISPs may be included in corporate database 774, for example, if the corporation has a special access price not reflected in POP information 1312.

Database maintenance 770 executes on management server 334 to process corporate database 774 and distribution database 772 to form the master client database 722 for the corporation. Master client database 722 include dialing tables for all the POPs and all the area codes represented in distribution database 772 and corporate database 774.

In response to a request from access 550 (FIG. 5) executing on remote computer 100, access service provider 720 sends relevant portions of master client database 722 or corporate database 774 to the remote computer. Access 550 stores those received portions in local database 552 on remote computer 100. Access 550 requests data in order of potential importance to a user to remote computer 100. For example, dialing information for the current location the remote computer is calling from is more important than information for other locations. Locations that have been visited recently are more important than locations that are rarely visited. In this way, although the whole master client database may not be updated, the parts most likely to the useful to a user are requested. Also, if a connection is terminated while data is being transferred to access 550, the transfer is restarted the next time a connection is established.

Figure 14:
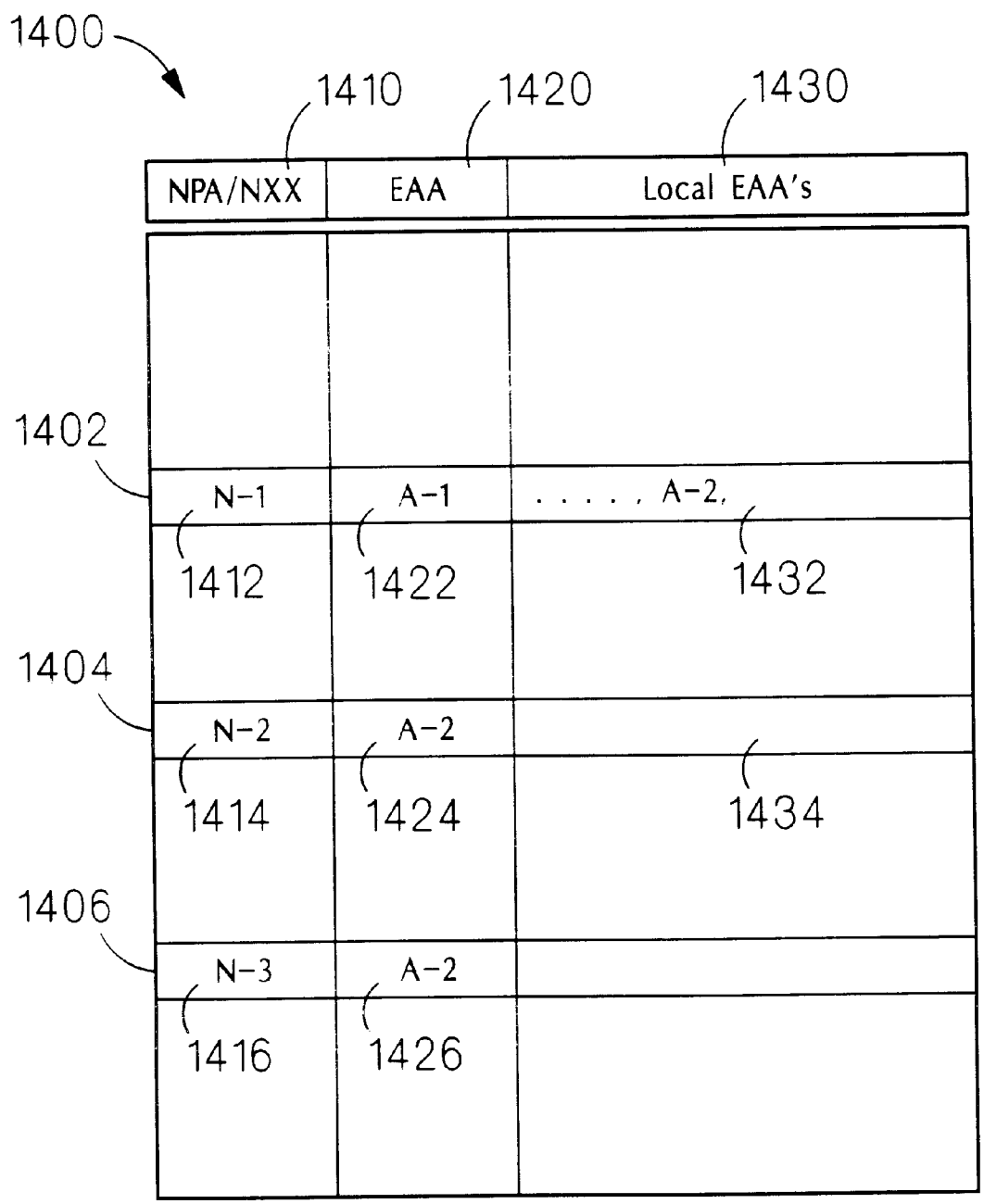
FIG. 14 illustrates local calling information provided in a telephone rate database.

The process illustrated in FIG. 13 includes a series of data transformations. Referring to FIG. 14, local calling area information in telephone rate database 1310 is essentially arranged as local calling area table 1400. The table has three main fields. The first, NPA/NXX 1410, includes an area code/exchange pair. The second, EAA 1420, is a geographic area, an EAA, of the area code/exchange in the first field. The third field, local EAAs 1430, is a list of the of geographic exchange areas (EAAs) which are local to the area code/exchange in the first field. To understand how this table is used to determine whether a particular call is within a local calling area, suppose a call is being made from area code/exchange N-1, for example from area code "617" and exchange "542". This area code/exchange is associated with a record 1402 in which the first field 1412 has the value N-1. The third field or that record 1432 includes a list of geographic exchange areas to which a call from area code/exchange N-1 is local. This third field includes A-2 as an EAA to which a local call can be made. Two other records are shown. In the first record 1404, an area code/exchange N-2 is indicated in the first field 1414. The EAA of that exchange is indicated as A-2 in the second field 1424. As A-2 is included in the local EAA field 1432 of the record for area code/exchange N-1, a call from N-1 to N-2 is local. Note that a call from N-2 to N-1 is not necessarily local. For instance, if the local EAA field 1434 for N-2 does not include A-1, then a call from N-2 to N-1 is not in fact local. A third record 1406 shows another exchange N-3 in geographic area A-2 to which a local call can be made from exchange N-1.

Figure 15:
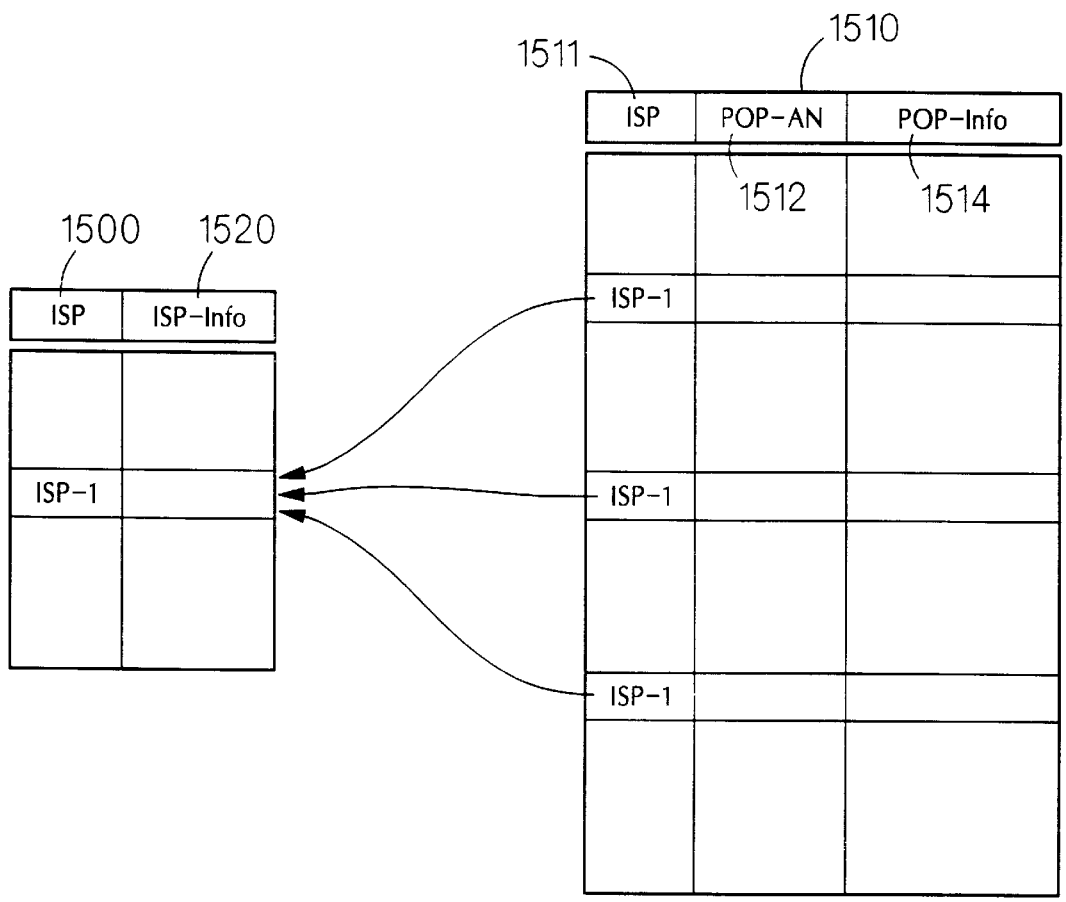
FIG. 15 illustrates POP information provided in a POP information database.

Referring to FIG. 15, POP information 1312 (FIG. 13) includes ISP information 1500 including information for each ISP. For a particular ISP, ISP information 1500 includes ISP info 1520 which includes ISP-specific information such as pricing information for that ISP. A POP table 1510 includes records for all the POPs. For a particular POP, POP table 1510 includes ISP 1511, a pointer into ISP information 1500 for the ISP that operates that POP, POP-AN 1512, a telephone access number, and associated POP information, POP-INFO 1514, related to the POP accessed by calling that access number. POP-INFO 1514 also includes information related to communication protocols and data rates supported using that access number, and can include pricing information.

Figure 16:
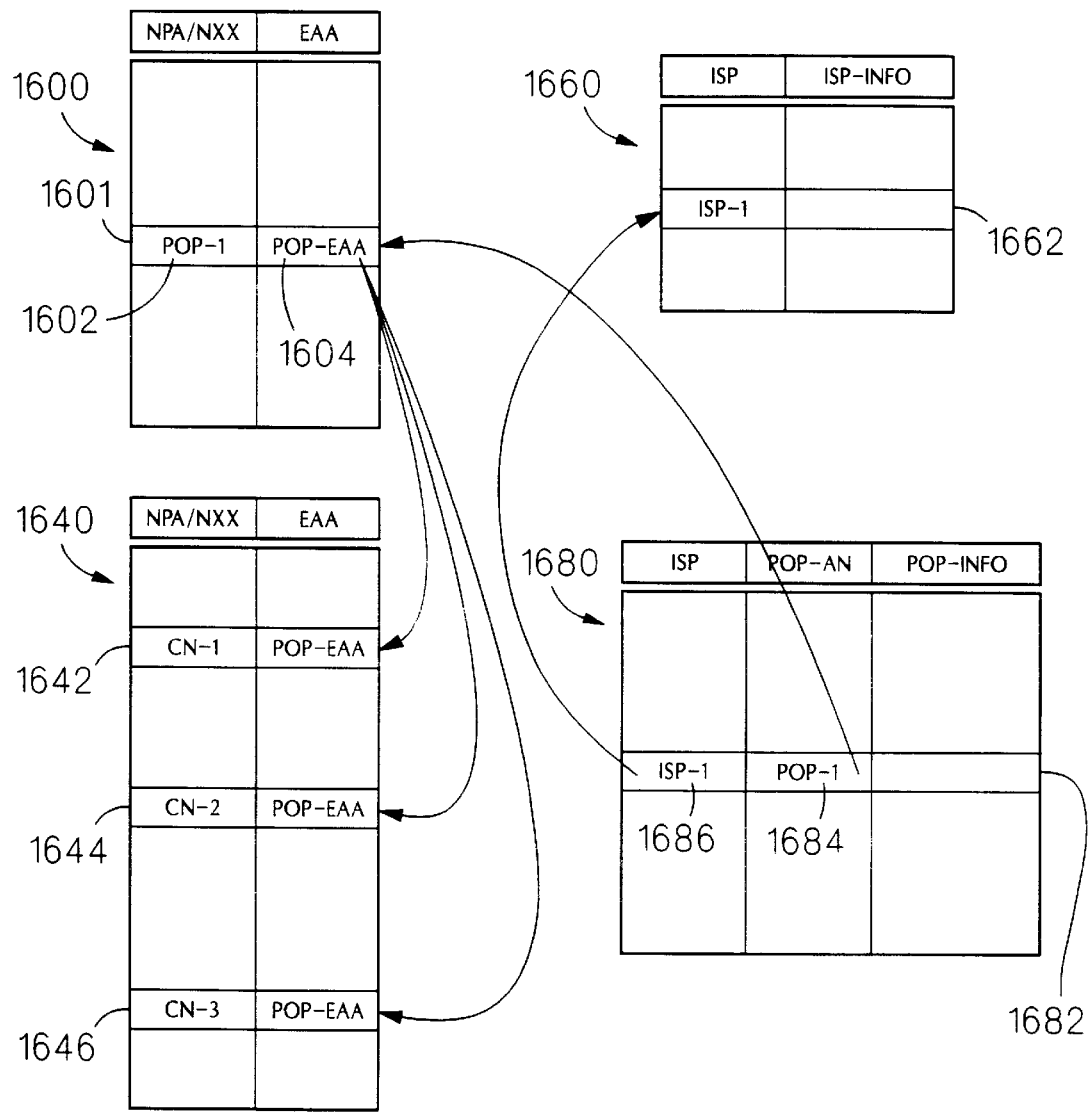
FIG. 16 illustrates relational tables which hold local calling information and POP information.

Distribution database 1330 (FIG. 13), as well as distribution database 772 (FIG. 7) which is a copy of distribution database 1330, includes a set of relational database tables. Referring to FIG. 16, these table include an EAA table 1600, and a local calling EAA table 1640, both of which are derived from local calling area table 1400, and an ISP table 1660 and a POP table 1680 derived from ISP information 1500. EAA table 1600 associates area code/exchanges (NPA/NXX) with their geographic area index, or EAA. Local calling EAA table 1640 associates area code/ exchanges (NPA/NXX) with the EAAs to which that exchange can make local calls. POP table 1680 associates an ISP, a POP, a telephone access number for that POP and other POP related information. ISP table 1660 associates an ISP with ISP related information, such as pricing information.

Corporate database 774 includes an additional ISP table and POP table holding similar information to ISP table 1660 and POP table 1680 in distribution database 772.

Database maintenance 770, which executes on management server 334, takes corporate database 774 and distribution database 772 and creates master access database 772, which include data formatted as shown in FIG. 12. NPA files 1200 are built up incrementally. Referring to FIG. 16, for each POP record in POP table 1680, for instance a record 1682 with a telephone access number POP-1 1684, the geographic index of that POP is determined by finding a record 1601 that associates the area code and exchange of the POP telephone access number, POP-1, with its geographic index, POP-EAA 1604. Then, using local EAA table 1640, all records for which POP-EAA is indicated to be a destination of a local call (records 1642, 1644, 1646) are determined. For the area code/exchanges for each these records (1643, 1645, 1647), the NPA file for that area code is updated by inserting an index for that POP in POP list 1220, while maintaining the correct index values in exchange index 1210. By looping through all the POPs in POP table 1680, as well as in the related POP table in corporate database 774, NPA files 1200 are incrementally built up. After all the POPs have been added to the NPA files 1200, the NPA files are compressed and stored in access database 720. ISP table 1660 and POP table 1680 directly provide the data in ISP table 1240 and POP table 1230 that is stored in access database 720.

Figure 17:
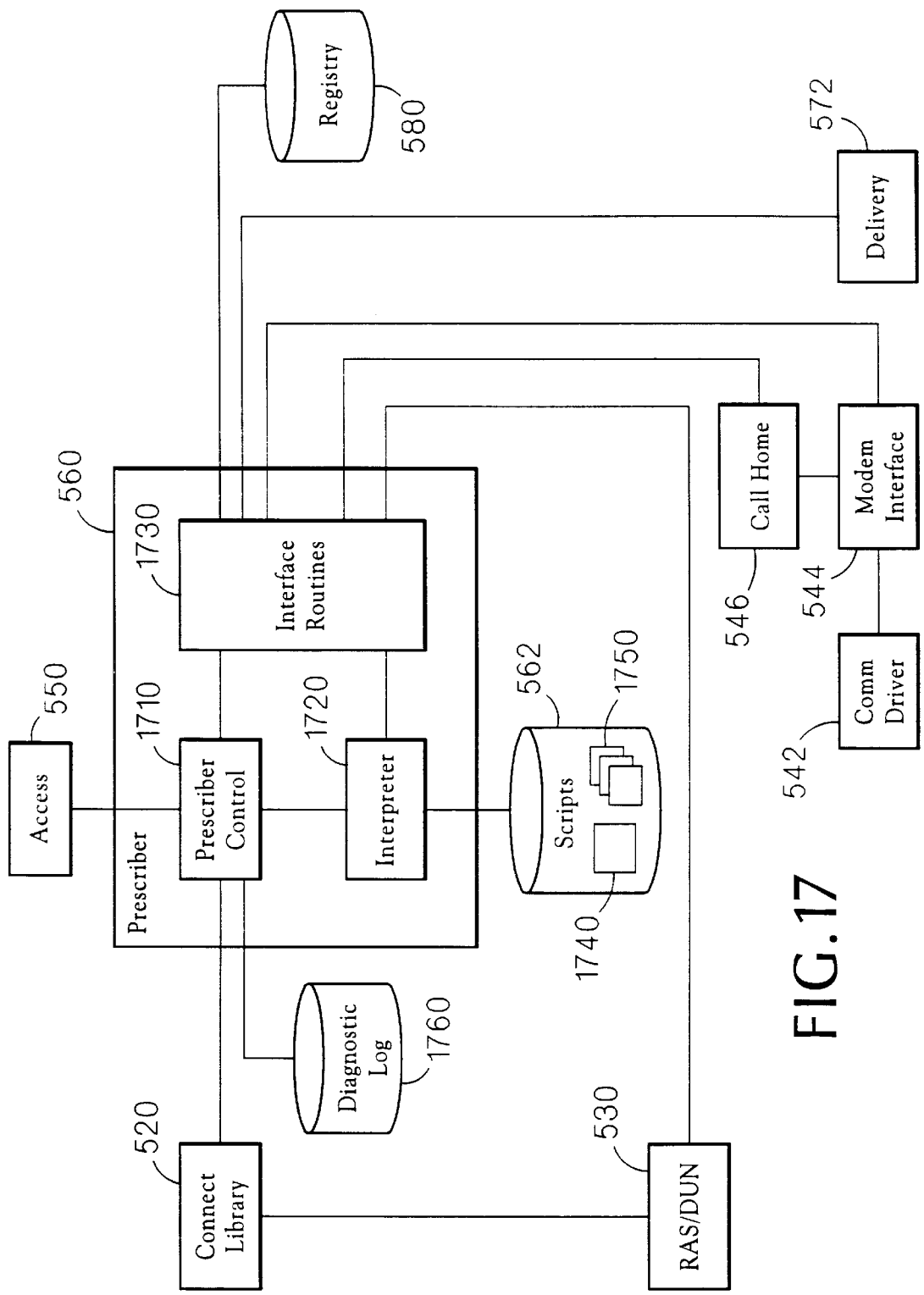
FIG. 17 is a detailed view of software modules on a remote computer.

We turn now to situations in which connect library 520 is unsuccessful in establishing a connection to a POP or to a tunnel server (steps 1126 and 1146 in FIG. 11). When connect library is unsuccessful in establishing a connection, it calls prescriber 560 (step 1160 in FIG. 11) to attempt to resolve the problem. Referring to FIG. 17, prescriber 560 includes three components. A prescriber control 1710 accepts error information from connect library 520 and initiates handling of those errors. In response to prescriber control 1710, an interpreter 1720 processes scripts 562 written in the "tcl" (Tool Command Language) scripting language. These scripts invoke procedures in interface routines 1730 which provide a mechanism for interacting with other modules of the connection software, including call home 546, modem interface 544, and RAS/DUN 530.

As described above, establishing a connection path between remote computer 100 and tunnel server 332 involves a sequence of steps, and can encounter a large number of different types of errors. After accepting an error message from connect library 520, prescriber control 1710 instructs interpreter 1720 to load and begin executing a top-level script 1740, the name of which is predetermined based on the broad category of the error. It should be noted that error messages returned by RAS/DUN 530 and passed to prescriber 560 may not accurately or precisely reflect the error that was actually encountered. For example, an underlying hardware problem can result in what appears to be a software error. Therefore, the diagnostic procedures specified in scripts 562, in general, first attempt to accurately determine what problem was actually encountered.

Top-level scripts 1740 include individual scripts that are invoked in the following conditions. A top level RAS error script is invoked in response to generated by RAS/DUN 530 itself. A top level network errors script is invoked in response to errors returned by RAS/DUN 530 that correspond to errors occurring in modules beyond RAS/DUN 530, such as communication services 535, or outside remote computer 100. A top level general errors script is invoked for errors not appropriate for the network errors of RAS errors scripts. A top level reboot script is invoked if the prescriber is called in response to a reboot initiated by a prescriber script (automated rebooting is described below). Top level scripts, including a top level daily script and a top level monthly script, are also provide for period maintenance tasks.

Top-level scripts 1740 first classify an error into one of a number of types based on the error message. The first type of error relates to RAS/DUN 530 not being able to establish a connection, but not encountering any hardware or software errors. A condition that might cause this type of error is a POP simply not answering the telephone. A second type of error relates to hardware errors, such as a modem malfunctioning. A third type of error relates to software errors. Such an error may be caused, for example, by improper installation of a device driver. A fourth type of error relates to unsuccessful authentication or initiation of a communication protocol. Another type of error relates to errors encountered by connect library 520 itself, such as not being able to call RAS/DUN 530. Depending on the type of error message received, top-level script 1740 branches to a particular secondary script 1750 to further address the problem.

The scripts specify tests and procedures that can be performed to diagnose and hopefully correct a problem. Scripts 562 implement one or more of the following tests and procedures. Examples of procedures that can be implemented by these scripts are as follows.

If the error message passed from connect library 520 to prescriber 560 indicates that a telephone connection could not be established, but that there is no hardware or software error, prescriber 560 attempts to make a telephone connection itself. First, it determines that it indeed is able to obtain a dial tone by controlling the modem directly using routines in modem interface 544. If a dialtone is detected and a dialing prefix (e.g., "9") is needed to access PSTN 120, prescriber 560 dials the prefix and confirms that it again obtains a dial tone. If a dial tone is not obtained, the prescriber attempts to dial the telephone access code without dialing the prefix in case the dialing prefix was not in fact needed. If prescriber 560 cannot connect without a prefix, and cannot obtain a dial tone with the specified prefix, it tries several alternatives based on the calling location (e.g., typical prefixes for the country the user is calling from), and, after exhausting normal alternatives, it prompts the user to enter new prefix information. If no dialtone can be obtained, prescriber 560 prompts the user to confirm that the modem is properly connected to the telephone line. If prescriber 560 can obtain a ring, but the call to the access number is not answered, it returns to connect library 520 with the response that the connect library should attempt to use the next connection path, which is associated with a different telephone number. If prescriber 560 completes a call to the access number but is unable to establish a data connection, it next tries to rule out problems with the modem itself. As the called modem may be at fault rather than modem 310 at the remote computer, prescriber 560 calls a reference modem that is known to function. In particular, a special reference modem 335 (FIG. 3) is attached to management server 334. Prescriber 560 obtains the telephone number for this reference modem from access 550 and dials the connection. If the modem 310 is not able to establish a data connection with the reference modem 335, the configuration of modem 310 is suspect. One source of problem the modem may have is in attempting to negotiate a modem protocol with the called modem. Prescriber 560 attempts to call reference modem 335 again, this time using a specific modem protocol. In particular, the modem protocol used is the most basic protocol that has the greatest chance of actually connecting. If this too fails, then the modem hardware is likely at fault.

If the error message indicates a hardware error, prescriber 560 performs some of the same steps to determine the cause of the hardware error. Using modem interface 544, it first verifies that it can actually establish communication with the modem. For instance, many modems provide a command monitor in firmware which executes on the modem and which processes commands and status inquiries. If prescriber 560 determines that it is indeed able to interact with the command monitor without a hardware error, it attempts to make a telephone connection to the access number. It can again attempt to go through the steps to establish communication with the current access number in the connection path list, and can also call the reference modem 335 at the management server.

Even though a connection to a POP cannot be established, prescriber 560 may successfully connect to management server 334. If such a connection is possible, prescriber 560 can establish a connection through call home 546 to call home 760 on management server 334. In certain cases, a modem hardware problem may be correctable by upgrading the modem firmware. Call home 760 uses access 712 to determine whether any appropriate firmware updates are available. If one is available that may be relevant, it is transferred to prescriber 560 which then performs the steps necessary to install the new firmware.

If prescriber 560 is able to connect to the reference modem using a specific modem protocol, such as a slow speed protocol that does not use features such as error correction or encryption, the prescriber can instruct connect library 520 to attempt to connect to the current POP using that same protocol. In this way, a remote user may establish a connection path, although the path may be slower than desired.

In the case of a software error, two common problems addresses by prescriber 560 are software misconfiguration and software version mismatch. To determine whether modem 310 is accessible through comm driver 542, prescriber 560 attempts to access the modem. To determine which port the modem is connected to, prescriber 560 reads registry 580. Registry 580 includes information written by RAS/DUN 530 that allows prescriber 560 to determine which port was used on the last dialing attempt by RAS/DUTN 560. Once prescriber 560 determines which port was used, it attempts to communicate with the modem on that port through modem interface 544. Modem interface 544 provides high level routines that are used to access and configure modem 310.

If modem 310 is not accessible through comm driver 542, prescriber 560 checks whether the comm driver appears to be functioning properly by accessing various routines provided by the driver. If the driver does not seem to be functional, prescriber 560 reinstalls the driver if it has a copy on a local disk on remote computer 100. If prescriber 560 determines that the driver needs to be reinstalled, and doesn't have a local copy, it obtains a copy from management server 344 using call home 546. Call home 546 places a telephone call and communicates with a modem at the managements server. A corresponding call home module on the management server provides the required driver by transferring a file over the modem connection using a low level file transfer protocol, in this instance, using the ZMO-DEM protocol. Prescriber 560 reinstalls the driver, and causes the operating system to reboot itself in order to complete the installation process. In order to maintain its state through the reboot, prescriber 560 writes information in access 550 before rebooting the system.

Prescriber 560 can check the version numbers of various software modules that can result in software errors due to version mismatches. If a suspect version is found, it checks the version numbers and dates of all relevant modules. If prescriber 560 determines that there is a version problem, it attempts to reinstall the correct versions if they are available on the remote computer, or it downloads the required software modules using call home 760.

To determine whether a connection between modem 310 and the modem at the POP can be established, prescriber 560 can dial the POP directly using modem interface 544. If a modem connection is established, then prescriber 560 can assume the problem was encountered during the process of providing login information, or in establishing the communication protocol, such as PPP, that was to be used to communicate between the remote computer and the POP.

If connect error occurs while attempting to establish communication with tunnel server 332, prescriber 560 first checks whether it can communicate with other well known addresses on the Internet. It can attempt to communicate with a well known domain name server (DNS). Also, it can attempt to communicate with router 326 that provides connectivity between corporate communication network 140 and Internet 130. Finally it attempts to communicate with tunnel server 332. Depending on which of these Internet addresses are accessible from remote computer 100, prescriber may take different courses of action. For example, if router 326 is accessible, but tunnel server 332 is not, it can return to connect library 520 with instructions to try to connect to the next tunnel server in the connection path list. If on the other hand router 326 is not accessible, the problem may be with the ISP's backbone, which may not provide connectivity to router 326 or may be experiencing a high error rate preventing a connection from being established. In such a case, prescriber 560 can return instructions to connect library 520 to go back and establish a POP connection to the next POP in the connection path list. In this way, prescriber 560 can backtrack through connection steps that appear to have been competed successfully.

Prescriber 560 maintains a diagnostic log 1760 (FIG. 17) which records its activities. When a connection to management server is established, this information is passed through delivery 572 and delivery 710 to logging service provider 740 (FIG. 7) which collects information from various remote computers in a log 742. This log can be used to discover consistent problems encountered by more than one remote computer. For example, a particular telephone access number may not function correctly. This information can be used to update the information used by access 550 in determining connection path lists so that calls to the non-functional access number are not attempted. In addition to automatically scanning log 742 to modify master client database 722, errors encountered by prescriber 560 can be used to automatically generate "trouble tickets" in an associated help desk system. In addition, failed attempts to connect to a reference modem on the management server, or failed attempts to connect to tunnel server 332 can be matched to logged events at the remote computer, and associated with a single trouble ticket.

Prescriber 560 can support several operating modes. In one mode, it can favor methods that aim to establish a connection as quickly as possible, without necessarily establishing a lowest cost connection or diagnosing problems encountered with particular access paths. In another mode, it can favor methods that identify and attempt to resolve problems with the lowest cost access path. Prescriber 560 can also favor autonomous operation, or can favor user interaction, such as presentation of choices to a user. This latter mode can be used, for example, by a technician attempting to resolve a problem.

Prescriber scripts 562 are downloadable from management server 334. These scripts are provided to management server 334 from a centralized site along with or as part of distribution database 772. In this way, as new approaches to diagnosing problems on remote computers are developed, they are available to remote computers 100. Along with updated scripts, software updates, such as drivers and modem firmware, can also be distributed from the central location. The connection system can therefore support many more diagnostic strategies than those described above, as those strategies are implemented in scripts that can be downloaded at a later date.

Some prescriber scripts can also be called to perform routine maintenance activities. For instance, a particular named script can be called periodically (e.g. weekly) to perform maintenance such as upgrading software modules.

Prescriber scripts make use of extensions to the tcl language, in the form of built-in functions, that are used to interact with other software modules on the remote computer. A function is provided to determine the serial (COMM) port corresponding the a RAS entries. Functions are provided to open, close, write to, and read from, a modem attached to a specified serial port. A function is provided to initiate a reboot process. This function stores information in non-volatile memory that is used by the prescriber after the reboot is complete to determine that it itself initiated the reboot process, and that it should invoke the top level reboot script. A function is also provided to communicate with access 550 to access local database 552 or data stored on the management server. Another function is used to communicate with call home 546 and file transfer 547. This function includes the option of communicating with a reference modem at the management server to verify the proper functioning of the local modem, as well as the option to retrieve files or configuration parameters from the management server.

In operation, software modules on computers, such as remote computer 100, tunnel server 332, or management server 334, shown in FIG. 3, communicate to perform various management related tasks. For example, access 550 (FIG. 5) on remote computer 100 receives information from access service provider 720 (FIG. 7) executing on management server 334 that is used to update local database 552 (FIG. 5). A communication infrastructure, called the delivery system, links the communicating computers. On each computer, a delivery module, such as delivery 572 (FIG. 5) on remote computer 100, delivery 620 (FIG. 6) on tunnel server 332, and delivery 710 (FIG. 7) on management server 334, provide other modules with access to this communication infrastructure. Together, these cooperating delivery modules make up the delivery system.

The delivery system provides communication services between software modules executing on the same machine as well as modules executing on different machines. The system provides secure communication between machines, and enforces a security policy for communication between modules executing on different machines. This security policy is based on a set of levels of trust, called rings. When communicating between machines, delivery uses the TCP/IP protocol suite to transfer data.

A software module sends messages to other modules on behalf of a specific user that has provided credentials that can be used to authenticate that user. Before communicating with other modules on behalf of a specific user, a software module registers with the delivery module executing on the same machine, and provides an identifier for the user. Registering with the delivery system creates a "delivery user" that can send and receive messages through the delivery system.

A delivery module accepts messages from a delivery user addressed to other delivery users in one of two modes. A message can be sent to another delivery user in a directed mode. Alternatively, in a non-directed mode, a message can be published and delivered to one or more appropriate recipients of the message not necessarily known to the sender. Furthermore, a published message can be sent in a multicast mode in which the delivery system provides the message to all appropriate recipients of the message. A published but not multicast message, a "best effort" message, is provided to at most one appropriate recipient. Note, as is described further below, a published message may not be delivered to any recipient if none is appropriate.

A directed message is explicitly addressed to another delivery user, indicating both the host on which the module is executing, as well as an identifier of the particular user on that machine. This addressing information can be obtained, for example, from a received message in order to reply to the received message.

A message published by a delivery user is associated with a set of characteristics that are used to determine which other delivery users, if any, should receive the message. Some characteristics of the message are determined by characteristics of the sending delivery user. These characteristics can include the authorization level (a "ring" level, described in detail below) of the sending user. Some characteristics of the message are explicitly specified by the sending delivery user. These explicitly specified characteristics can include desired characteristics of a receiving delivery user (recipient characteristics). These recipient characteristics can include the ring level of the recipient. The explicitly specified characteristics can also include characteristics of the message content itself. These content characteristics can include membership indicators for a set of predefine content classes, in this embodiment, specified using a 32-bit content bit-mask. The meaning of the various content classes is not necessarily known to the delivery system. In this embodiment, the content classes include general informational messages, performance messages, accounting messages, trouble ticket messages, statistical information messages, configuration messages, and operational messages.

A delivery user that subscribes to messages with the delivery system also provides various characteristics that are used to determine which published messages it should receive. Each characterization of desired messages is termed a "subscription." A subscription includes some characteristics that are determined by characteristics of the subscribing delivery user. These characteristics can include the ring level of the receiving user. Some characteristics of the message are explicitly specified by the subscribing delivery user. These explicitly specified characteristics can include desired characteristics of a sending delivery user (sender characteristics). These sender characteristics can include the ring level of the sender. The explicitly specified characteristics can also include characteristics of the message content itself. These content characteristics can include membership indicators for a set of predefine content classes.

When a delivery user publishes a message, the characteristics associated with the message are matched against the characteristics of the subscriptions known to the delivery system. Messages are sent to delivery users who have specified compatible subscriptions.

Figure 18:
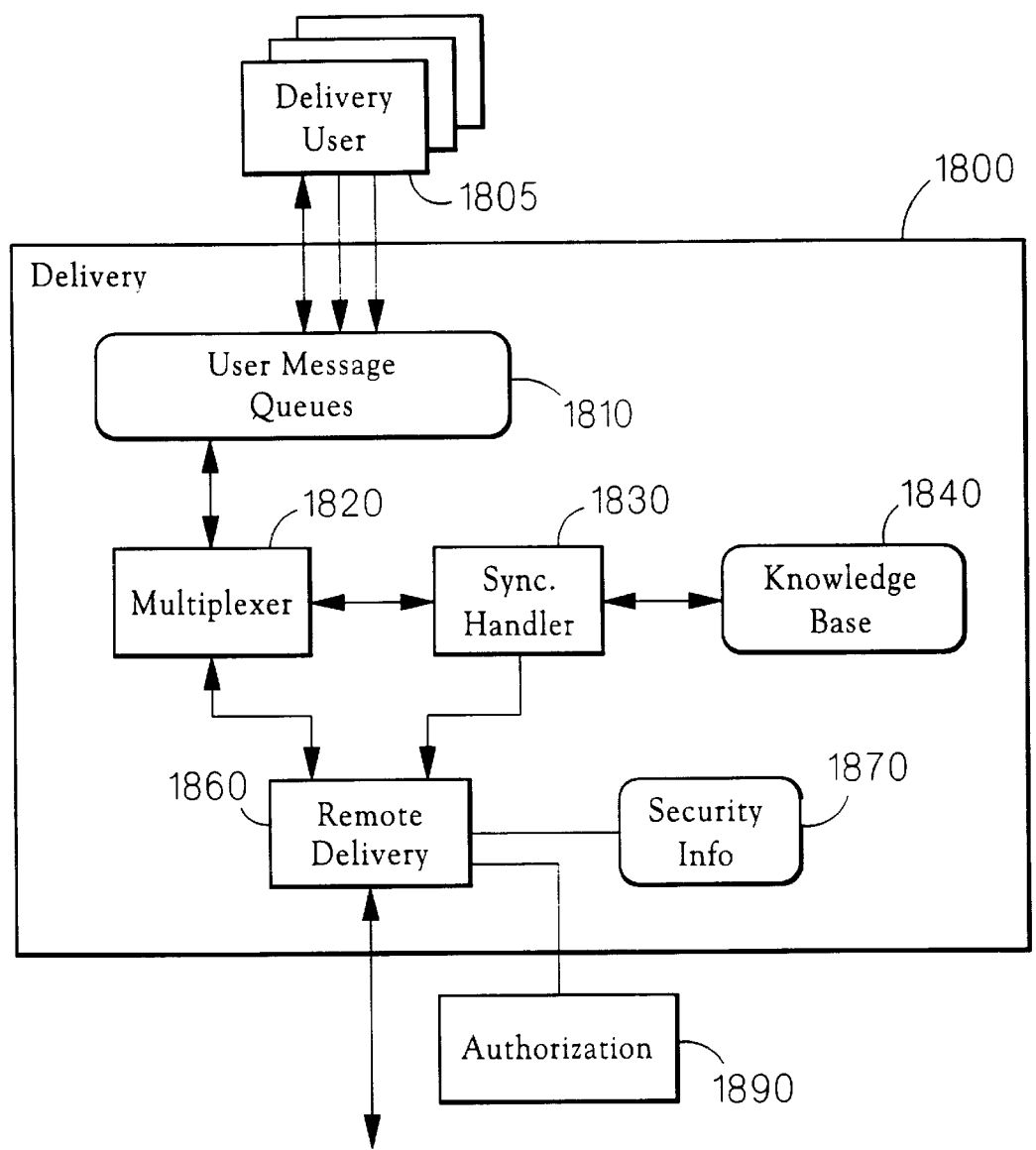
FIG. 18 is a detailed view of elements of a delivery module.

Referring to FIG. 18, a representative delivery module, delivery 1800, includes several elements. Delivery users 1805 interface with user message queues 1810 which hold inbound and outbound messages to delivery users 1805. When a delivery user 1805 sends a message, that is provides a message with an explicit address, that message is first stored in user message queues 1810 and then passed to a multiplexer 1820 and placed in an appropriate priority queue in multiplexer 1820. Multiplexer 1820 processes messages in priority order. If the message is addressed to a delivery user on the same machine, the message is passed back to user message queues 1810. If the message is addressed to a delivery user on another machine (that is, a delivery user that has registered with another delivery module) the message is passed to remote delivery 1860. If remote delivery 1860 does not have an active session with the remote delivery module, remote delivery 1860 first establishes a session with the remote delivery module using a procedure described below. If a session was already active, or once a new session is established, the message is transferred to the remote delivery module after appropriate security check (described below) are performed.

If delivery user 1805 publishes a message, that message is passed to user message queues 1810 and then to multiplexer 1820 where it is placed in an appropriate priory queue. Published messages are sent to sync handler 1830 for farther processing. Sync handler 1830 accepts the message and determines where to send the message using a knowledge base 1840. Knowledge base 1840 includes information related to all the user subscriptions that have been registered at this and other delivery modules. Based on knowledge base 1840, sync handler 1830 determines which local and remote delivery modules have users that have registered for the published message. In the case of a multicast message, sync handler 1830 sends the message to all delivery modules that have users registered for that message. For each local delivery, the message is placed in an appropriate local user message queue 1810. For each remote delivery module that should receive the message, sync handler 1830 determines the appropriate users that such receive the message at that remote delivery module, and passes the message along with the list of users to remote delivery 1860. If a session to the remote delivery module is not active, remote delivery 1860 establishes a session to the remote delivery module when it receives the message from sync handler 1830. Remote delivery 1860 then passes the message and the list of addressees to the remote delivery module. In the case of a best effort published message, sync handler 1830 chooses one of the appropriate recipients and directs the message to that user. Outbound messages for other delivery modules, and inbound messages from other delivery modules, are stored in priority queues in multiplexer 1820 based on their priorities. Message in these priority queues are processed by multiplexer 1820 in priority order. Published messages can also be delivered locally, in which case sync handler 1830 passes the message to the appropriate local delivery user. Note that it is possible that a published message has no appropriate recipients, in which case the message is discarded.

When delivery 1800 receives a message from a remote delivery module, remote delivery 1860 accepts the message, and after performing security-related checks on the message, as described below, passes the message to multiplexer 1820 where it is placed on the appropriate priority queue. Multiplexer 1820 then passes the message to sync handler 1830 to handle local delivery.

The delivery system implements a distributed security policy based of levels, or rings, of trust. The ring level is indicated by an integer in the range 0 to 3. The lower the ring number, the more trusted a user or system is. The system prevents disclosure of message to recipients at remote machines which are at higher ring levels (less trusted) than intended by a publisher of a message. In addition, the system prevents a sender of a message attributing a lower ring level to the message than the sender's own ring level. This prevents a user or system providing information to other modules that is unduly trusted.

Figure 19:
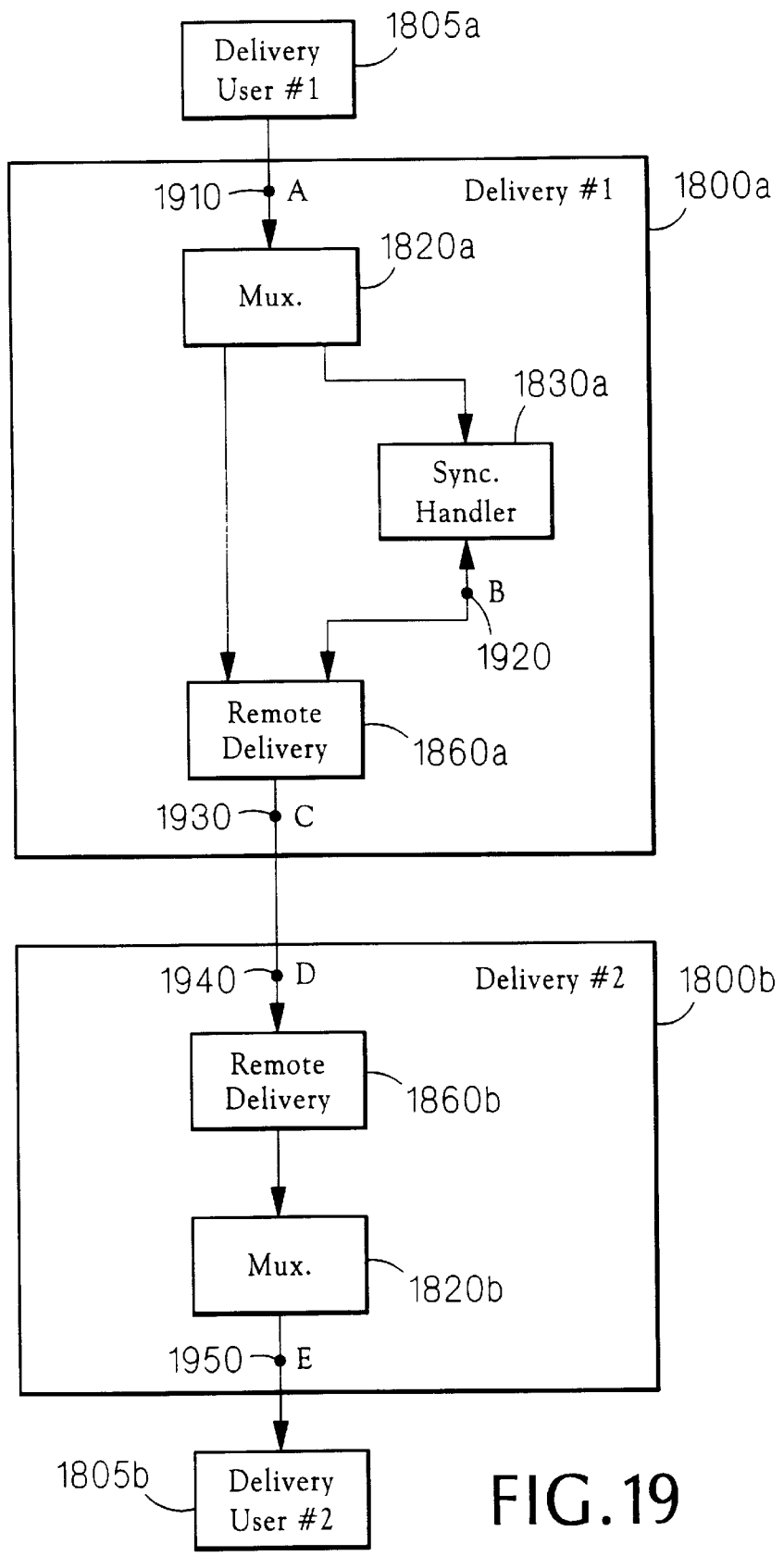
FIG. 19 is a communication path through a delivery system between two delivery users on different computers.

Referring to FIG. 19, the security policy is implemented at several points on a path from a sender, delivery user #1 1805*a* to a receiver, delivery user #2, 1805*b*, indicated by points A–E (1910–1950). When delivery user #1 1805*a* provides a message to delivery #1 1800*a*, it indicates the source ring level. Delivery #1 1805*a* is aware, based on a prior authentication process that is described below, or that delivery user's true ring level. If delivery #1 1805*a* is attributing a source ring level to the message that is lower than it's authorized ring level, the message is blocked at point A 1910. If the message is a published, rather than sent, it is next passed to sync handler 1830*a*. A second security check is based on the requested ring levels of the subscribers, and the destination ring level specified by the sender. Messages are only directed to destinations that are authorized to the specified destination ring level or lower at point B 1920 on the path. If a message is to be sent from the delivery #1 1800*a* to delivery #2 1800*b*, the destination ring level of the message must be no lower than the ring level of delivery #2 1800*b*. If this is not the case, then the delivery #2 1800*b* cannot be trusted with the message, and the message is blocked at point C 1930. Once the message is received by delivery #2 1800*b*, remote delivery #2 1860*b* checks that the source ring level specified in the message is no lower than the ring level to which delivery #1 is authorized. If the source ring level is too low, the message is blocked at point D 1940. Finally, multiplexer 1820*b* checks that the actual receiving delivery user 1805*b* is authorized at a ring level no higher than the specified destination ring level. If the ring level of delivery user #2 1805*b* is too high, the message is blocked at point E 1950. In this way, information in messages is never disclosed to systems or users that are less trusted than intended by the sender, and messages and not accepted from remote delivery modules with a specified source ring level that indicates that the message should be more trusted than the authorization level of the sending delivery module.

Figure 20:
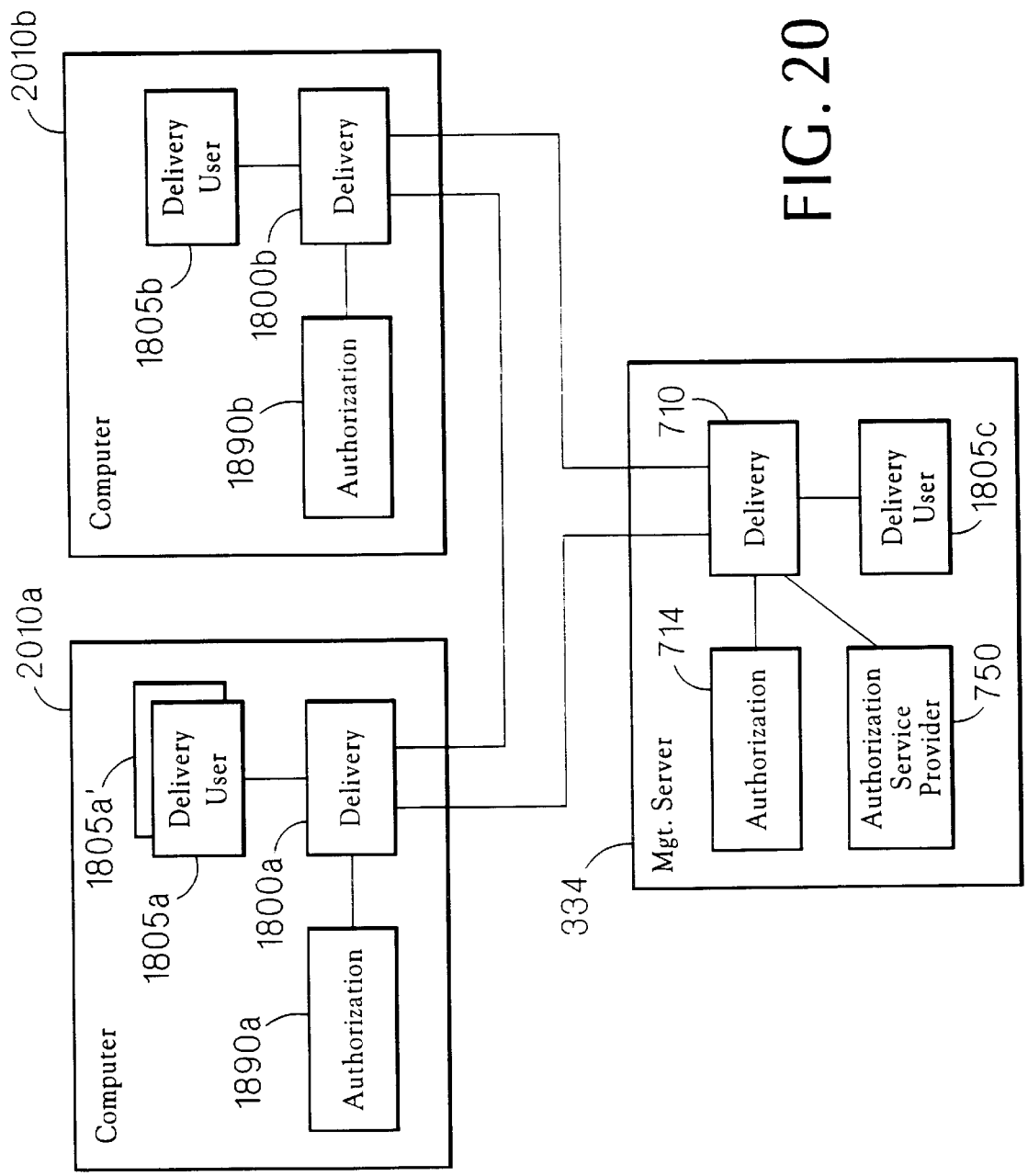
FIG. 20 illustrates three computers coupled through a delivery system.

Each delivery user, as well as each delivery module itself, can be authorized at a particular ring level. This authorization level is used to restrict communication through the delivery system, as outlined above. Each pair of delivery modules which communicate directly with each other perform a mutual authentication exchange. An illustrative series of authentication exchanges is illustrated in FIG. 20 between two computers 2010*a* and 2010*b* and management server 334. A description of the detailed authentication between delivery modules is deferred.

Referring to FIG. 20, startup operation of a delivery system can be understood by considering an illustrative example of deliver users 1805*a* and 1805 on computers 2010*a* and 2010*b* communicating with delivery 710 on management server 334.

When management server 334 is started, delivery 710 is executed. Delivery 710 is the master delivery module of the delivery system. Authorization service provider 750 also starts and establishes communication with delivery 710. After delivery 710 and authorization 750 are running, authorization service provider 750 and a delivery user 1805*c* register with delivery 710 on management server 334.

At some later time, computer 2010*a* is started and delivery 1800*a* begins execution. Delivery 1800*a* uses a predetermined IP address for a master delivery service, in this example delivery 710, in order to join the delivery system. Delivery 1800*a* contacts delivery 710, and an authentication exchange is initiated using a default username. Delivery 710 uses authentication service provider 750 to authenticate the delivery 572. Delivery 1800*a* uses default credentials which are sufficient to reach authorization to the least trusted level, ring 3. Delivery 710, is initially authorized to be at ring 0, the most trusted ring. Based on the authentication of delivery 1800*a* using the default credentials, a session key is established for communication between delivery 1800*a* and delivery 710.

After delivery 1800*a* has joined the delivery system, delivery 710 provides a copy of the current knowledge base. As a result, delivery 1800*a* is then aware that delivery user 1805*c* has registered with the delivery system.

After delivery 1800a has joined the delivery system a delivery user 1805a registers with delivery 1800a. Delivery user 1805a presents a numeric identifier, a cookie, for a user of computer 2010a who previously presented his credentials. Those credentials are held by authorization 1890a. Delivery 1800a provides the cookie to authentication 1890a, which in return provides the user's credentials. In an authentication exchange described below, delivery 1800a determines that the user's credentials match the credentials available to delivery 710, and deliver 710 determines that the credentials held by authentication service provider 750 match the credentials provided by delivery 1800a. Delivery 1800a and delivery 710 therefore have at this point mutually authenticated delivery user 1805a, and, as a result of the authentication exchange, are also both aware of the authorization ring of delivery user 1805a. In this example, delivery user 1805a is at ring 2. Delivery 1800a is authorized at the lowest ring for which it has a registered delivery user, in this case ring 2. Based on authentication of delivery user 1805a, a session ring level for delivery 1800a, at the ring level of delivery user 1805a, is established. A new session key is used for communication between delivery 1800a at the new session ring level and delivery 710. Delivery 1800a would revert to the previous session ring level if delivery user 1805a were to unregister from the delivery system at this point, for example if the user of computer 2010a were to log off.

At some later point, delivery user 1805a publishes a message by passing it to delivery 1800a. Delivery user 1805c at management server 334 is an appropriate recipient of this message. As described above, the message is associated with characteristics such as a destination ring level and content categories of the message. Delivery 1800a checks its knowledge base to see if it knows of any other modules that have subscribed to this message, and that also are at least as trusted as the destination ring level indicated by delivery user 1805a when it provided the message. In this example, delivery user 1805c satisfies these tests, and therefore is a recipient of the message.

When delivery 710 receives the message for delivery user 1805c that was sent by delivery user 1800a, it first checks that the source ring level is no lower than the session ring level of delivery 1800a. It then checks that the destination ring level is no lower than the ring level to which delivery user 1805c is authorized. If the source and destination ring level checks are satisfied, the delivery 710 stores the message in its user message queues. At some later point, delivery user 1805c requests data from delivery 710 and is passed the message.

If a delivery user 1805a' registers with delivery 1800a, the same procedure is followed as with delivery user 1805a. Note that if the same cookie is presented by delivery user 1805a' as was presented by delivery user 1805a, then repeated authentication of that user is not required. Delivery 1800a already knows the ring level to which that user is authorized. If delivery user 1805a' is a new user, that user is authenticated. If delivery user 1805a' is not authorized to a lower ring than the previous user, then the session key for communication between delivery 1800a and delivery 710 is not changed. Only a single session key is used at any one time for communication between a particular pair of delivery modules.

When computer 2010b also joins the system, delivery 1800b contacts delivery 710 and establishes a delivery session in the same manner as was carried out by delivery 1800a when it joined the delivery system. Delivery 1800b also obtains a copy of the current knowledge base from delivery 710.

If deliver user 1805b sends or publishes a message that must be delivered to delivery user 1805a on computer 2010a, a delivery session between delivery 1800b and delivery 1800a must first be established. Delivery 1800b initiates an authentication exchange with delivery 1800a using the credentials for deliver user 1805b. In order to authenticate the user, deliver 1800a communicates with authorization service provider 750 using the delivery system.

Figure 21:
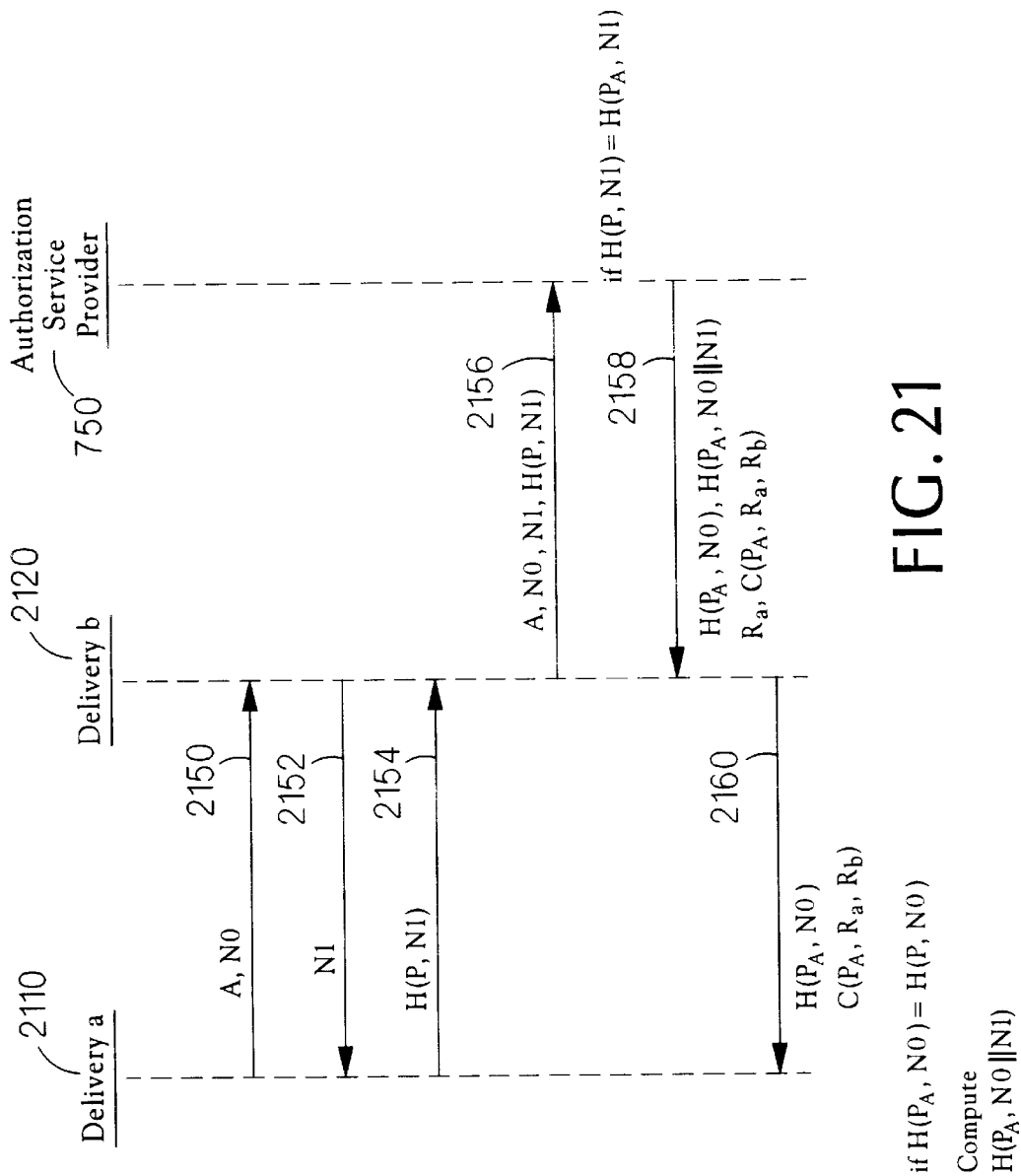
FIG. 21 illustrates a sequence of exchanges used to establish a delivery session.

Referring to FIG. 21, the details of an authentication exchange, including determination of a session (encryption) key for use on that session, include a sequence of exchanges. Delivery a 2110 is the delivery module initiating the exchange, and delivery b 2120 is the delivery module with which delivery a 2110 wants to communicate. The labeled arrows in FIG. 21 correspond to messages sent between the delivery modules or between delivery b and the authentication service provider The label A corresponds to a username or other identifier or key of the delivery user initiating the session. N0 corresponds to a random number generated at delivery a 2110. The first step is for delivery a to send A and N0 to delivery b (2150). In response to receiving A and N0, the username and random number from delivery a 2110, delivery b 2120 sends back a random number, N1, that it generated (2152). The random numbers N0 and N1 form challenges to which each receiving delivery module must respond. In response to receiving N1, delivery a computes a one-way hash function H(P,N1) using a secret password, P, and the random challenge, N1. Any of a variety of previously agreed upon hash functions can be used, such as the commonly used the Message Digest 5 (MD5) hash function. Delivery a then sends the computed hash value to delivery b (2154). In order to determine whether delivery a truly knows the secret password P, delivery b would compute the hash value directly if it knew the secret password. However, in order to maintain security, the password for that user is kept by authentication server 750 and not distributed to the delivery services. Instead, delivery b passes the received A, N0, and H(P,N1), and the random challenge N1 that it generated, to authentication service provider 750 (2156). Authentication service provider holds a password, $P_A$, for user A. If authentication service provider 750 determines that its password $P_A$ for user A is the same as the password P known to delivery a, it informs delivery b that user A has successfully authenticated. In particular, authentication service compares the received value of H(P,N1) to a value $H(P_A,N1)$ that it computes locally. If they match, then user A has successfully authenticated. In order to allow delivery a to authenticate delivery b, authorization service provider 750 also computes a response to the challenge value N0, $H(P_A,N0)$. Authorization service provider also computes a session key $k_A=H(P_A,N0\|N1)$, where $N0\|N1$ is a bitwise or of random numbers N0 and N1. Authorization service provider 750 also computes $C(P_A,R_a,R_b)$, the ring levels of the user at delivery a and the current ring level of delivery b, $R_a$ and $R_b$, respectively, encrypted using $P_A$. Authorization service provider passes back $H(P_A,N0)$, $k_A=H(P_A,N0\|N1)$, $R_a$, and $C(P_A,R_a,R_b)$ to delivery b (2158). Delivery b passes $H(P_A,N0)$ and $C(P_A,R_a,R_b)$ back to delivery a (2160). Delivery a compares the received value $H(P_A,N0)$ to the value H(P,N0) it computes locally, and if they are equal, authenticates delivery b. By decrypting $C(P_A,R_a,R_b)$, delivery a knows the ring level of the user a delivery a and the ring level of delivery b, as known to authentication service provider 750. Delivery a then computes its value of the session key as $k=H(P,N0\|N1)$. Delivery a and delivery b now share a common session key that can be used for encryption of communication between delivery a and delivery b.

Figure 22:
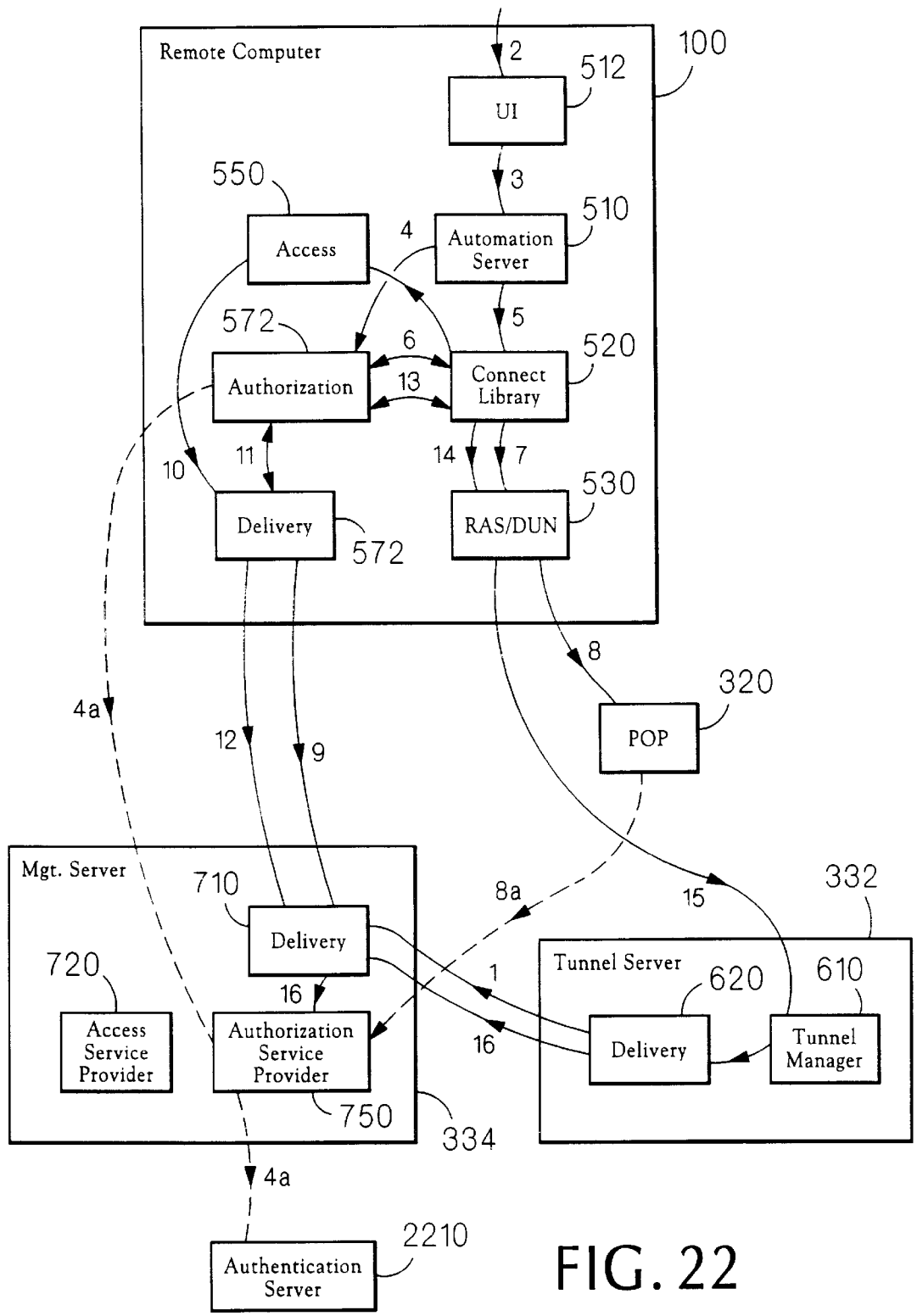
FIG. 22 illustrates a sequence of authentication exchanges.

In the description above, authentication and authorization operations are performed at various points. Referring to FIG. 22, an exemplary sequence of authorization and authentication operations is illustrated. These operations begin just after the startup of management server 334, and span the subsequent startup of tunnel server 332, startup of remote computer 100, and establishment of a tunnel connection from remote computer 100 through POP 320. A numbered series of arrows in FIG. 22 indicates the operations, and in general, the initiator of the operation at the tail of the arrow.

In FIG. 22, initially management server 334 has already started up and delivery 710 and authorization server 750 are in communication. This communication is secure since both modules are executing on a single, physically secure, machine.

After tunnel server 332 starts up, delivery 620 contacts delivery 710 to establish a delivery session (step 1). Delivery 620 provides credentials with which it was preconfigured. After an authentication exchange with delivery 710, delivery 620 and delivery 710 are mutually authenticated.

Some time after delivery 620 at tunnel server 332 and delivery 710 at management server 334 have mutually authenticated, a user executes the connection software at remote computer 100. The user provides his credentials (username and password) to UI 512 (step 2) which in turn provides them to automation server 510 (step 3) which in turn provides them, along with a cookie, to authorization 570 (step 4). Automation server 510 then provides the cookie to connect library 520 (step 5).

Connect library 520 then begins making a connection to POP 320. Connect library 520 retrieves the user's credentials from authorization 570 (step 6) and provides the credentials to RAS/DUN 530 (step 7) which uses these credentials to establish a PPP connection to POP 320 (step 8). RAS/DUN 530 can use a variety of authentication protocols with POP 320. One common protocol the Challenge Handshake Authentication Protocol (CHAP). The basic exchange between RAS/DUN 530 and POP 320 is that RAS/DUN 530 provides a username A, POP 320 then replies with a random number N, and RAS/DUN 530 replies to the challenge with a hash function of a secret password and the random number. Therefore if POP 320 holds the user's password, it can authenticate the user by comparing the response to the challenge to its own computation of the hash function of the password and the random number.

After IP connectivity is provided to remote computer 100 through POP 320, delivery 572 on remote computer 100 establishes a delivery session with delivery 710 at management server 334 (step 9).

Access 550 then passes delivery 572 a message for access service provider 720 along with the cookie for the user that is logged in to remote computer 100 (step 10). Delivery 572 obtains the credentials for the user from authorization 570 (step 11) and performs a mutual authentication of that use with delivery 710 according to the exchange illustrated in FIG. 21 (step 12).

Connect library 520 in the meantime is establishing a connection with tunnel server 332. It again obtains the user's credentials from authorization 570 (step 13) and provides them to RAS/DUN 530 (step 14). After connecting to tunnel server 332, RAS/DUN 530 uses the user's credentials to authenticate the user at the tunnel server (step 15). Tunnel server 332 does not hold the user's password and instead relies on authentication service provider 750 at management server 334 to perform the authentication (step 16).

Authentication service provider 750 is also configured to accept requests from other computers than tunnel server 332 to provide an authentication. For a CHAP authentication exchange. In particular, POP 320 does not have to hold the user's password. Instead, it can pass the username that it receives from RAS/DUJN 530 (in step 8) to authentication service provider 750 (step 8a) and forward a challenge generated by authentication service provider back to RAS/DUN.

The connection software also supports a situation in which authentication service provider 750 does not in fact hold the user's password. For example, a user may use a one-time-use password approach in which the user and an authentication server 2210 share a secret, Q, but that secret is not shared by any other module. Furthermore, that secret can be used for only a single authentication of for a limited amount of time. To support authentication service provider 750 being able to repeatedly authenticate a user as the user establishes connections with various software modules, a second secret, P, (a ticket) is generated for that user. This second secret is shared between authorization 570 on remote computer 100 and authorization service provider 750 on management server 334. After this second secret is generated, it serves the same role as the user's password in the discussion above.

Figure 23:
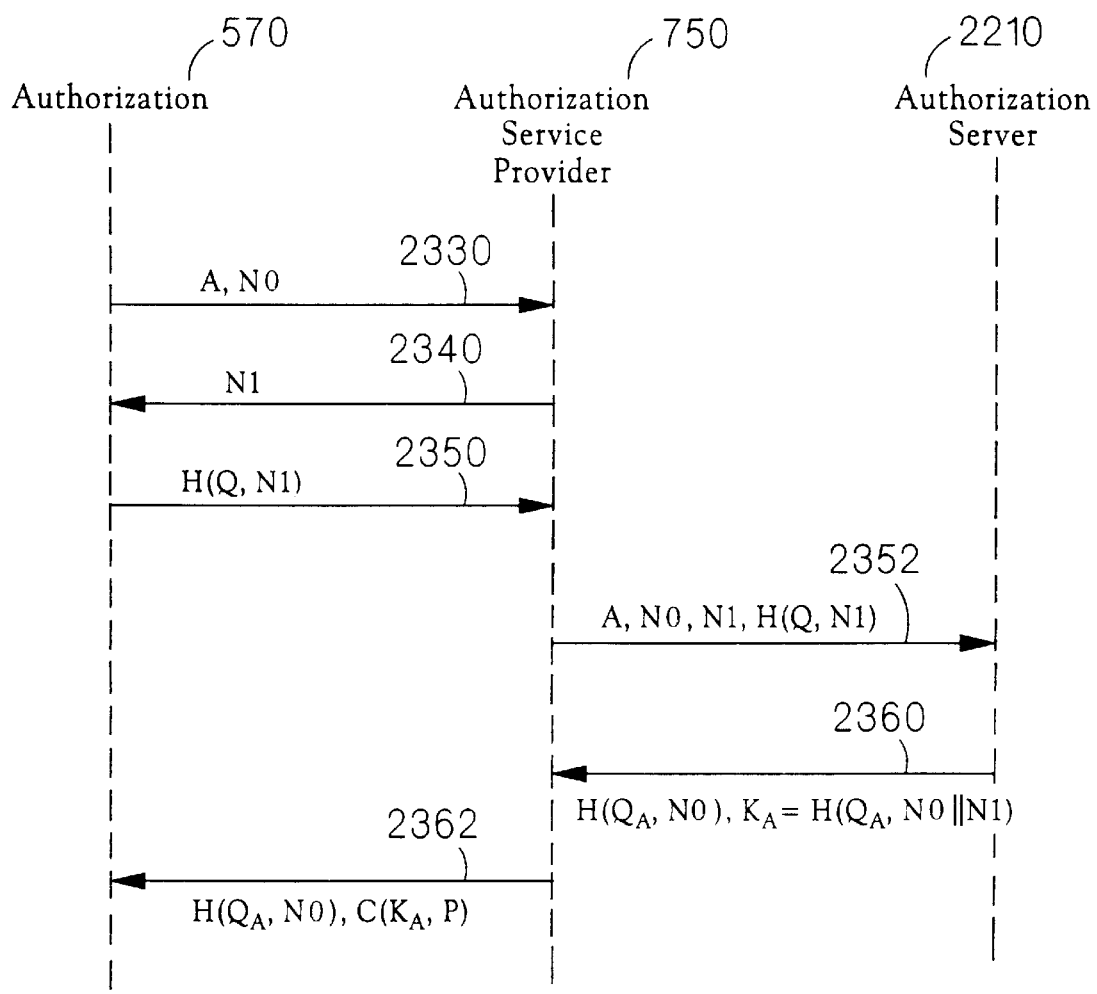
FIG. 23 illustrates a sequence of exchanges used to generate a second shared secret using an authorization server.

At a point after remote computer 100 has established IP connectivity with management server 334, but before delivery sessions or connections through tunnel server 332 have been established for that user, authorization 570 interacts directly with authorization service provider 750, without using the delivery system. Referring to FIG. 23, authorization 570 and authorization service provider 750 carry out an exchange very much like a mutual authentication exchange that is carried out between delivery modules. In particular, authorization 570 passes the username A and a random challenge N0 to authorization service provider 750 (2330). Authorization service provider 750 passes back challenge N1 (2340), to which authorization 570 replies with a hash function of the one-time-use password Q, and challenge N1, H(Q,N1) (2350). Authorization service provider 750 passes N1 and H(Q,N1) to authorization server 2210 (2352) and authorization server 2210 compares that hash value with one it computes locally based on its copy of the one-time-use password $Q_A$. Authorization service provider 750 also passes the username A and authorization service's challenge N0 to authorization server (2352). Authorization server 2210 computes a hash value $H(Q_A,N0)$ which it passes back to authorization service provider 750 (2360). Authorization service provider passes $H(P_A,N0)$ to authorization 570 (2362) which allows authorization 570 to authenticate authorization service provider 750. Authentication server 2210 also computes a key $k_A=H(Q_A,N0\|N1)$ which it passes to authorization service provider 750. Authorization service provider 750 computes a ticket, P, and passes $C(k_A,P)$, the ticket P encrypted using the key $k_A$. Authorization 570 also computes the key $k=H(Q,N0\|N1)$ and decrypt P. In response to subsequent requests for credentials for that user, authorization 570 provides P. Note that P can have any form, and in particular, can have the form of a username and password that can be used by other authorization and authentication services.

In a related embodiment of the invention, rather than providing dialing information to a corporate communication system typically using the services of an ISP, the system can be used to provide dialing information to access the ISP itself without establishing communication with any particular corporation. In this case, the management server is coupled to the Internet and is operated by an ISP, or possibly multiple ISPs.

In another related embodiment, a management server operated by an ISP can provide dialing information related to access to the Internet through that ISP, an a management server at a corporation can provide information related to users at that corporation, and access points, such as tunnel servers, used to access a corporate network. In such an arrangement, an access module on a remote computer would receive some of the information for its local database from the ISP's management server, and some of the information from the corporation's management server.

In the embodiments described above, connection between a remote computer and a corporate communication system is generally initiated by a user interacting through a user interface. The connection procedure can be initiated without the user's explicit command, for example as a result of an application attempting to communicate with a local computer at the corporation. The network address of the local computer then serves the function of the "calling to" field that would have been provided by the user. Local database includes routing information that allows mapping the address of a local computer to an access point, such as a tunnel server, that can be used to communicate with the local computer.

Other types of access paths can also be used in embodiments of the invention. For example, in FIG. 4, a direct communication path from remote computer 100 through PSTN 120 to corporate communication system 140 is shown. PSTN 120 can equivalently be replaced by another type of communication network. For instance, a data network can be used to provide remote access to tunnel server 332 without necessarily establishing an IP connection between remote computer 100 and tunnel server 332. This would be the case if an ISP provided a "tunnel concentrator" at a POP and simply transported the tunnel communication between the remote computer and the tunnel server.

Figure 24:
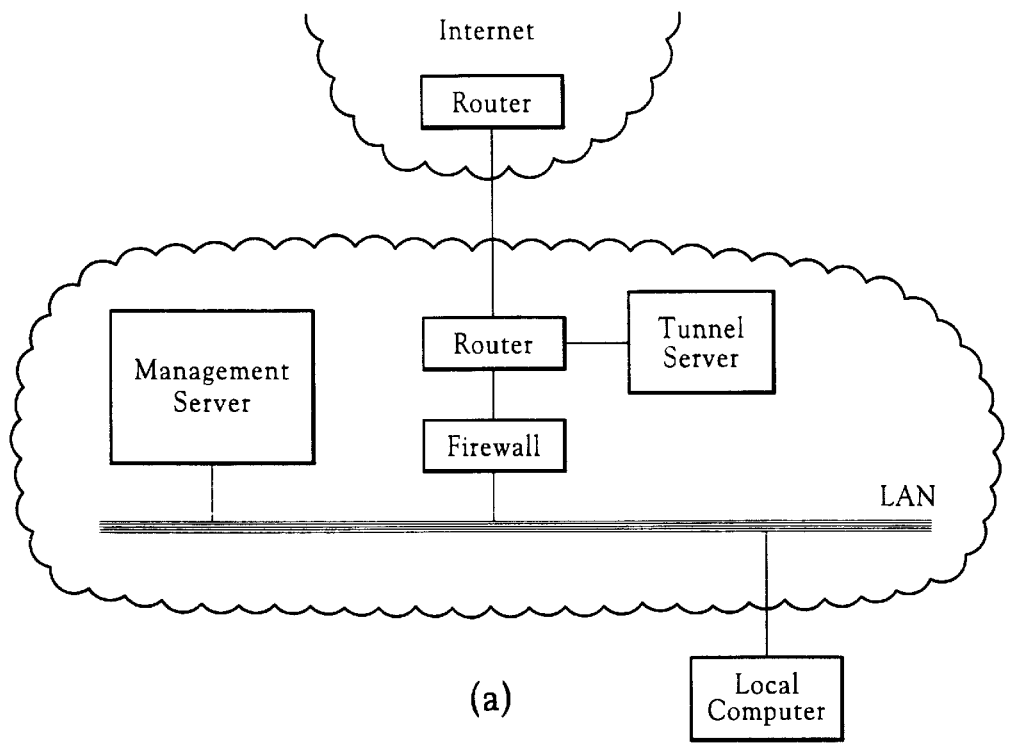
FIG. 24 shows alternative arrangements of a tunnel server and a firewall.
Figure 24:
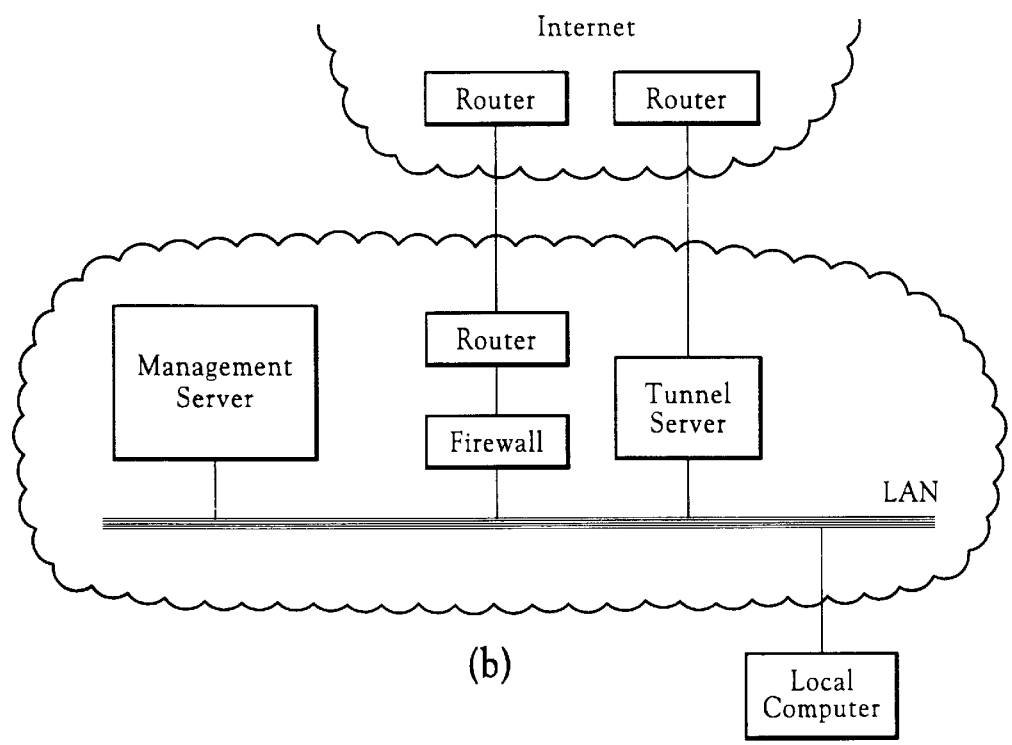

Also, as shown in FIG. 24, alternative arrangements or a tunnel server and a firewall can be used. For example, as shown in FIG. 24(a), a tunnel server can operate outside a firewall, and provide services including authentication of remote users to the firewall. Alternatively, as shown in FIG. 24(b), a tunnel server can provide a second point of access between a LAN and the Internet, thereby avoiding congestion at the firewall.

In the described embodiments above, separates costs are stored for use of a particular access number and use of a particular tunnel server. Other alternative cost structures can also be used. For example, there are situations in which performance factors are in general dependent on the particular combination of POP and a tunnel server. For example, if a single ISP operates both a POP and provides the point of access for a tunnel server to the Internet, performance may be better than if one ISP operates a POP and a second ISP provides the tunnel server access to the Internet.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. Software stored on a computer readable medium for causing a remote computer to perform the function of:

establishing a data communication path between the remote computer and a computing resource including determining a plurality of access paths for communicating between the remote computer and the computing resource wherein the plurality of access paths includes a plurality of telephone access paths that each includes a dialed telephone channel to a different telephone access number associated with that access path, determining a cost for each of the plurality of access paths, wherein each of the access paths is associated with a cost function and determining a cost for each of the access paths includes evaluating the cost function associated with said access path, selecting a first of the plurality of access paths based on the cost for each of the access paths, and initiating establishment of communication over the selected first of the access paths.

2. The software of claim 1 wherein the computing resource is a computer network.

3. The software of claim 1 wherein the cost function associated with each of the access paths includes a monetary factor and a performance factor.

4. The software of claim 1 wherein selecting the first of the plurality of access paths includes selecting an access path for which the cost is lower than for other of the access paths.

5. The software of claim 1 wherein the selected first of the plurality of access paths is one of the plurality of telephone access paths and initiating establishment of communication over said selected access path includes dialing the telephone access number associated with the selected path.

6. The software of claim 1 wherein the software further causes the computer to perform the functions of:

accepting an identification of a location of the remote computer; and wherein determining the plurality of access paths includes determining a plurality of access paths according to telephone charges associated with use of dialed telephone channels from the location of the remote computer to each of the different telephone access numbers.

7. The software of claim 6 wherein the software further causes the computer to perform the functions of:

accepting an identification of a user of the remote computer; and wherein the cost function associated with each of the access paths includes weighting terms associated with the identification of the user.

8. The software of claim 1 wherein the software further causes the computer to perform the functions of:

accepting a dialing database, including telephone access numbers;

accepting an identification of the computing resource; and wherein determining the plurality of access paths for communicating between the remote computer and the computing resource includes retrieving information related to the identified computing resource from the dialing database.

9. The software of claim 1 wherein establishing the data communication path further includes:

if communication over the first of the plurality of access paths is not established, selecting a second of the plurality of access paths based on the determined cost for each of the plurality of access paths, and initiating establishment of communication over the second of the plurality of access paths.

10. The software of claim 1 wherein establishing the data communication path further includes:

if establishment of communication over the first of the plurality of access paths is not successful, automatically performing diagnostics related to unsuccessful establishment of communication over the first of the plurality of access paths.

11. The software of claim 10 wherein automatically performing diagnostics includes interpreting a diagnostic script implementing a diagnostic procedure to determine a cause of unsuccessful establishment of communication over the first of the plurality of access paths.

12. The software of claim 11 wherein the software further causes the computer to accept the diagnostic script from another computer.

13. The software of claim 11 wherein the diagnostic procedure includes:

contacting a reference site not on the remote computer; and verifying that the remote computer can communicate with the reference site.

14. The software of claim 13 wherein contacting the reference site includes establishing a dialed telephone connection to a reference telephone number.

15. The software of claim 13 wherein contacting the reference site includes contacting a network device on a data network coupling the remote computer and the network device.

16. The software of claim 11 wherein the diagnostic procedure includes:

determining whether a software module on the remote computer requires installation; and if so, installing that software module.

17. The software of claim 1 further causing the remote computer to:

accept credentials from a user of the remote computer, the credentials including an identification of the remote user;

authenticate the user by using the credentials and an authentication service on another computer; and establish a management communication path to the other computer and accepting information including information for a dialing database over the management communication path;

wherein determining the plurality of access paths for communicating between the remote computer and the computing resource includes retrieving information related to the identification of the remote user from the dialing database.

18. The software of claim 17 wherein accepting information for the dialing database occurs while a communication path is established between the remote computer and the computing resource.

19. Software stored on a computer readable medium for causing a first computer to perform the functions of:

storing a dialing database that includes information for selecting an access path between a second computer and a computing resource;

establishing a management communication path between the first computer and the second computer, including authenticating the second computer; and providing information from the dialing database, including information for selecting an access path between the second computer and the computing resource to the second computer, over the management communication path.

20. The software of claim 19 wherein the software further causes the first computer to:

accept master dialing information;

accept local information, including information related to computing resources accessible from the remote computer; and maintain the dialing database using the master dialing information and the local information.

21. The software of claim 20 wherein the master dialing information includes telephone access numbers for access paths, and information related to a cost of communicating over dialed telephone connections to those access numbers from a plurality of remote locations.

22. The software of claim 21 wherein the information related to the cost of communicating over a dialed telephone connection to an access path includes monetary and performance related cost factors.

23. The software of claim 22 wherein the software further causes the computer to perform the functions of:

accepting performance related logging information from a plurality of remote computers; and updating the performance related cost factors in accordance with the logging information.

24. A method for establishing a data communication path between a remote computer and a computing resource including:

determining a plurality of access paths for communicating between the remote computer and the computing resource wherein the plurality of access paths include a plurality telephone access paths that each includes a dialed telephone channel to a different telephone access number associated with that access path;

determining a cost for each of said access paths, including evaluating a cost function to arrive at a cost of communicating between the remote computer and the computing resource over each of said telephone access paths;

selecting a first of the access paths based on the cost for each of the access paths; and initiating establishment of communication over the selected access path.

25. A method for distributing dialing information to remote computers comprising:

accepting master dialing information;

accepting local information, including information related to computing resources accessible from the remote computers;

maintaining a dialing database, which includes telephone access numbers for access paths from the remote computers to the computing resources, using the master dialing information and the local information;

establishing a management communication path to one of the remote computers, including authenticating the remote computer; and providing information from the dialing database to the remote computer over the management communication path, for use on the remote computer in selecting an access path between the remote computer and one of the computing resources accessible from the remote computer.

26. A communication system on a remote computer comprising:

a user interface for accepting an identifier of a location of the remote computer;

a means for determining a plurality of telephone access paths for communicating between the location of the remote computer and a computing resource, including a local database for storing telephone access numbers and cost factors for the telephone access paths;

a means for evaluating a cost function for each telephone access path, the cost function for each telephone access path characterizing a cost of communicating between the location of the remote computer and the computing resource over that telephone access path;

a means for selecting one of the telephone access paths in accordance with the result of evaluating the cost functions for each of the telephone access paths; and a communication interface for communication over the selected telephone access path.

27. A communication system comprising:

a management computer, including a dialing database for storing an association of a plurality of calling locations and corresponding subsets of a plurality of telephone access numbers for accessing a computing resource, and for storing an association of the telephone access numbers and monetary and performance factors related to data communication over dialed telephone connections from the calling location to the telephone access numbers; and a plurality of remote computers, each including a local database for storing part of the information stored in the dialing database on the management computer;

wherein each of the remote computers further includes software for causing the remote computer to determine, using information stored in the local database, a plurality of telephone access paths for communicating between the remote computer and a computing resource, evaluate a cost function for each of the plurality of telephone access paths, the cost function for an access path characterizing a cost of communicating between the remote computer and the computing resource over that access path, select one of the plurality of telephone access paths in accordance with a result of evaluating the cost functions for each of the telephone access paths, and communicate over the selected telephone access path; and wherein the management computer further includes software for causing the management computer to accept communication from each of the remote computers, and to provide information in the dialing database to the remote computers.

28. A diagnostic script stored on a computer readable medium including instructions that cause a computer to diagnose and correct a problem encountered while attempting to communicate with a computing resource remote from the computer, including instructions for contacting a reference site remote from the computer and verifying that the computer can communicate with the reference site wherein diagnosing and correcting the problem includes invoking a procedure to verify proper operation of a local modem on the computer, including establishing a telephone connection to a remote modem and transferring data between the local modem and the remote modem.

29. Software stored on a computer readable medium for causing a first computer to perform an authentication exchange with a second computer comprising:

sending a user identifier and a first challenge to the second computer;

receiving a second challenge from the second computer;

responding to the second challenge; and accepting a response to the first challenge computing an encryption key based on content of the first and the second challenges.

30. A method of mutual authentication of a first computer and a second computer comprising:

sending a user identifier and a first challenge from the first computer to the second computer;

receiving at the first computer a second challenge from the second computer;

sending a response to the second challenge to the second computer;

receiving a response to the first challenge from the second computer;

sending the user identifier, information from the first challenge, and the response to the second challenge, to a server computer; and receiving from the server computer the response to the first challenge.

31. A method of exchanging messages between software modules executing on different computers including:

at a first computer, authenticating a second computer based on credentials provided by a user of the second computer, including determining a level of trust of the second computer;

receiving a message from the second computer, the message indicating a destination and a trust level of the user of the second computer;

if, based on the trust level of the second computer and the trust level of the user of the second computer, the user of the second computer appears to be more trusted than the second computer, discarding the message, otherwise, forwarding the message to its destination.

32. The method of claim 31 wherein authenticating a second computer includes providing the credentials to a third computer and receiving an indication of the level of trust associated with the credentials from the third computer.

33. A method for enforcing access policies for a plurality of classes of remote users comprising:

maintaining an access database characterizing access paths from a plurality of remote locations to a computing resource; and distributing information from the access database to a plurality of remote computers, including distributing information to each remote computer such that software executing on a remote computer selects an access path from a remote location of the remote computer to the computing resource according to the class of the remote user of that remote computer.

34. The method of claim 33 wherein distributing information to the remote computers includes distributing different selection factors for different classes for remote users wherein the selection factors are used on the remote computers for selecting access paths from the remote computer to the computing resource.

* * * * *